US012739874B2

(12) United States Patent
Papasakellariou

(10) Patent No.: US 12,739,874 B2
(45) Date of Patent: Sep. 15, 2026

(54) INCREASING SPECTRAL EFFICIENCY AND REDUCING LATENCY FOR RANDOM DATA ARRIVAL TIMES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 18/403,042

(22) Filed: Jan. 3, 2024

(65) Prior Publication Data

US 2024/0244657 A1 Jul. 18, 2024

Related U.S. Application Data

(60) Provisional application No. 63/439,772, filed on Jan. 18, 2023, provisional application No. 63/441,232, (Continued)

(51) Int. Cl.
*H04W 4/00* (2018.01)
*H04W 74/08* (2009.01)
(Continued)

(52) U.S. Cl.
CPC ........ *H04W 74/08* (2013.01); *H04W 72/0446* (2013.01); *H04W 72/23* (2023.01)

(58) Field of Classification Search
USPC .................................................. 370/329, 330
See application file for complete search history.

(56) References Cited

U.S. PATENT DOCUMENTS 11,490,382 B2 11/2022 Salem
2022/0053552 A1* 2/2022 Li ......................... H04W 72/23
(Continued)

FOREIGN PATENT DOCUMENTS

WO 2021140351 A1 7/2021
WO 2022082606 A1 4/2022

OTHER PUBLICATIONS

International Search Report and Written Opinion issued Apr. 18, 2024 regarding International Application No. PCT/KR2024/000861, 6 pages.
(Continued)

*Primary Examiner* — Chuong T Ho

(57) ABSTRACT

Apparatuses and methods for latency reduction for transmission of data. A method performed by a user equipment (UE) includes receiving, by radio resource control signaling, first information for a configured grant (CG) configuration for transmission of physical uplink shared channels (PUSCHs), wherein the first information includes a time period; determining first transmission occasions (TOs), from a first set of TOs within the time period, for transmission of respective first CG-PUSCHs; and determining first control information providing an indication of the first TOs. The method further includes multiplexing the first control information in a first CG-PUSCH from the first CG-PUSCHs, and second control information in a PUSCH other than the first CG-PUSCH, and transmitting the first CG-PUSCH and the PUSCH. The second control information provides first acknowledgement information or channel state information. The transmission of the first CG-PUSCH overlaps in time with the transmission of the PUSCH.

18 Claims, 11 Drawing Sheets

Related U.S. Application Data filed on Jan. 26, 2023, provisional application No. 63/530,180, filed on Aug. 1, 2023.

(51) Int. Cl.
*H04W 72/0446* (2023.01)
*H04W 72/23* (2023.01)

(56) References Cited

U.S. PATENT DOCUMENTS

| | | | | |
|---|---|---|---|---|
| 2023/0115082 | A1* | 4/2023 | Khoshnevisan | H04W 72/0446<br>370/329 |
| 2023/0232397 | A1* | 7/2023 | Li | H04L 1/1671<br>370/329 |
| 2024/0172113 | A1* | 5/2024 | Abotabl | H04W 52/54 |
| 2024/0298271 | A1* | 9/2024 | Gao | H04L 5/0048 |
| 2025/0274939 | A1* | 8/2025 | Lee | H04W 72/115 |
| 2025/0287381 | A1* | 9/2025 | Lee | H04W 72/115 |

OTHER PUBLICATIONS

Moderator (Ericsson), “Moderator Summary#3—Study on XR Specific Capacity Improvements”, 3GPP TSG-RAN WG1 Meeting #111, R1-2212608, Nov. 2022, 80 pages.

Oppo, “Discussion on XR specific capacity enhancements techniques”, 3GPP TSG RAN WG1 #111, R1-2211491, Nov. 2022, 5 pages.

Sony, “XR-specific capacity enhancements and evaluation results”, 3GPP TSG RAN WG1 #111, R1-2211625, Nov. 2022, 12 pages.

Vivo, “Discussion on XR specific capacity enhancements”, 3GPP TSG RAN WG1 #111, R1-2212595, Nov. 2022, 13 pages.

“5G; NR; Physical channels and modulation (3GPP TS 38.211 version 17.4.0 Release 17)”, ETSI TS 138 211 V17.4.0, Jan. 2023, 141 pages.

“5G; NR; Multiplexing and channel coding (3GPP TS 38.212 version 17.4.0 Release 17)”, ETSI TS 138 212 V17.4.0, Jan. 2023, 206 pages.

“5G; NR; Physical layer procedures for control (3GPP TS 38.213 version 17.4.0 Release 17)”, ETSI TS 138 213 V17.4.0, Jan. 2023, 263 pages.

“5G; NR; Physical layer procedures for data (3GPP TS 38.214 version 17.4.0 Release 17)”, ETSI TS 138 214 V17.4.0, Jan. 2023, 236 pages.

“5G; NR; Medium Access Control (MAC) protocol specification (3GPP TS 38.321 version 17.3.0 Release 17)”, ETSI TS 138 321 V17.3.0, Jan. 2023, 254 pages.

“5G; NR; Radio Resource Control (RRC); Protocol specification (3GPP TS 38.331 version 17.3.0 Release 17)”, ETSI TS 138 331 V17.3.0, Jan. 2023, 1295 pages.

Supplementary European Search Report dated Mar. 12, 2026, in connection with European Patent Application No. 24744884.8, 5 pages.

* cited by examiner

INCREASING SPECTRAL EFFICIENCY AND REDUCING LATENCY FOR RANDOM DATA ARRIVAL TIMES

CROSS-REFERENCE TO RELATED APPLICATION AND CLAIM OF PRIORITY

This application claims priority under 35 U.S.C. § 119(e) to U.S. Provisional Patent Application No. 63/439,772 filed on Jan. 18, 2023, U.S. Provisional Patent Application No. 63/441,232 filed on Jan. 26, 2023, and U.S. Provisional Patent Application No. 63/530,180 filed on Aug. 1, 2023. The above-identified provisional patent applications are hereby incorporated by reference in their entirety.

TECHNICAL FIELD

The present disclosure relates generally to wireless communication systems and, more specifically, to resolving collisions among transmissions of data channels by a user equipment in a network, and to enhancing capacity and reducing transmission latency by a user equipment in a network, such as for support of traffic that can be associated with augmented reality, virtual reality, or cloud gaming that are jointly referred to a XR traffic.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for increasing spectral efficiency and reducing latency for random data arrival times.

In one embodiment, a method performed by a user equipment (UE) is provided. The method includes receiving, by radio resource control signaling, first information for a configured grant (CG) configuration for transmission of physical uplink shared channels (PUSCHs), wherein the first information includes a time period; determining first transmission occasions (TOs), from a first set of TOs within the time period, for transmission of respective first CG-PUSCHs; and determining first control information providing an indication of the first TOs. The method further includes multiplexing the first control information in a first CG-PUSCH from the first CG-PUSCHs, and second control information in a PUSCH other than the first CG-PUSCH, and transmitting the first CG-PUSCH and the PUSCH. The first CG-PUSCH is earliest in time among the first CG-PUSCHs. The second control information provides first acknowledgement information or channel state information. The transmission of the first CG-PUSCH overlaps in time with the transmission of the PUSCH.

In another embodiment, a UE is provided. The UE includes a transceiver configured to receive, by radio resource control signaling, first information for a CG configuration for transmission of PUSCHs. The first information includes a time period. The UE further includes a processor operably coupled to the transceiver. The processor is configured to determine first TOs, from a first set of TOs within the time period, for transmission of respective first CG-PUSCHs; determine first control information providing an indication of the first TOs; multiplex the first control information in the first CG-PUSCH from the first CG-PUSCHs; and multiplex second control information in a PUSCH other than the first CG-PUSCH. The first CG-PUSCH is earliest in time among the first CG-PUSCHs. The second control information provides first acknowledgement information or channel state information. The transceiver is further configured to transmit the first CG-PUSCH and the PUSCH. The transmission of the first CG-PUSCH overlaps in time with the transmission of the PUSCH.

In yet another embodiment, a base station (BS) is provided. The BS includes a transceiver configured to transmit, by radio resource control signaling, first information for a CG configuration for reception of PUSCHs. The first information includes a time period. The BS further includes a processor operably coupled to the transceiver. The processor is configured to determine first ROs, from a first set of ROs within the time period, for reception of respective first CG-PUSCHs. The transceiver is further configured to receive a first CG-PUSCH from the first CG-PUSCHs and a PUSCH other than the first CG-PUSCH. The first CG-PUSCH is earliest in time among the first CG-PUSCHs. The reception of the first CG-PUSCH overlaps in time with the reception of the PUSCH. The first CG-PUSCH includes multiplexed first control information that provides an indication of the first ROs. The PUSCH includes multiplexed second control information that provides first acknowledgement information or channel state information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
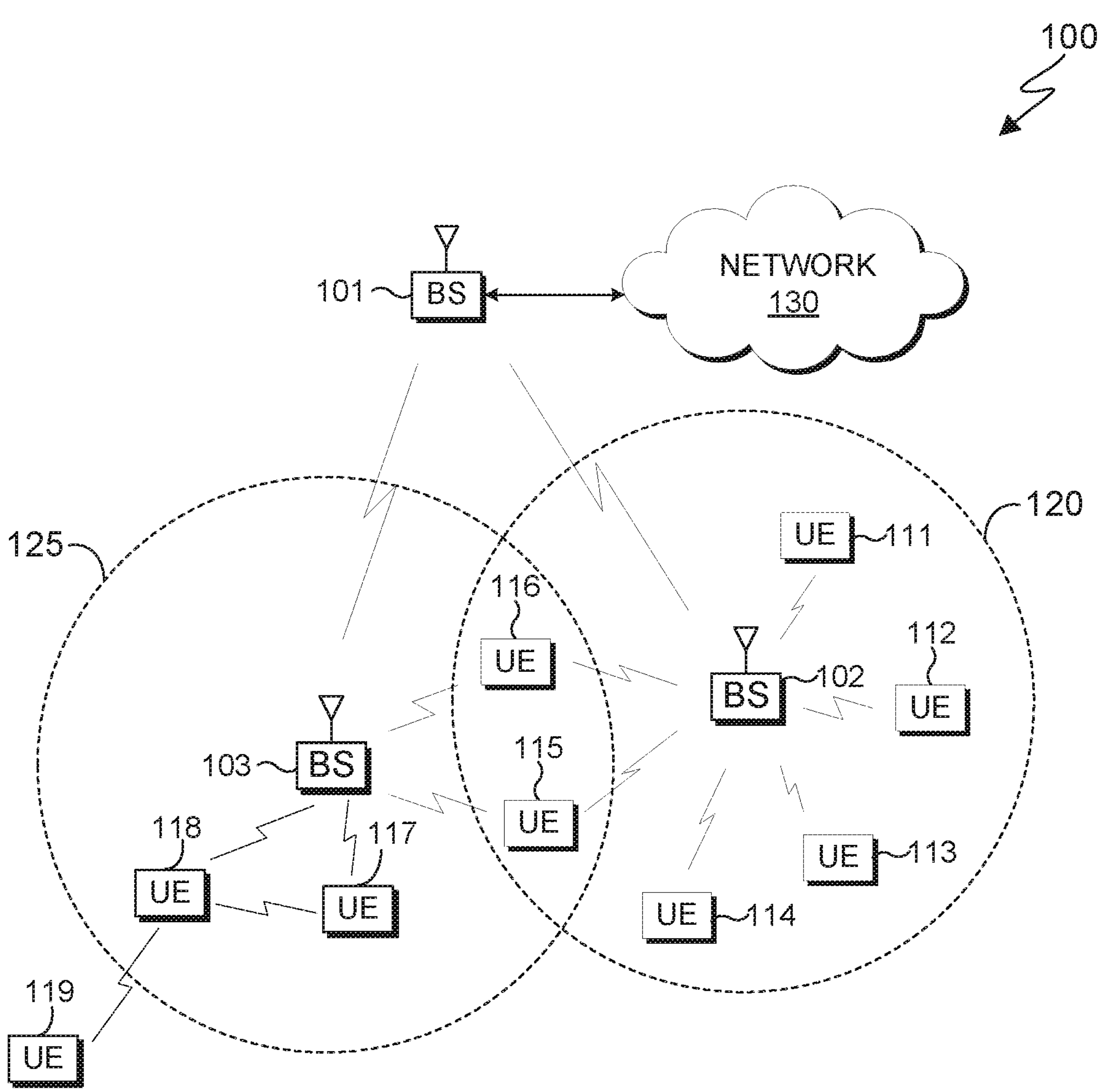
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.4.0, "NR; Physical channels and modulation;" 3GPP TS 38.212 v17.4.0, "E-UTRA, NR, Multiplexing and Channel coding"; 3GPP TS 38.213 v17.4.0; "NR, Physical Layer Procedures for Control"; 3GPP TS 38.214 v17.4.0; "NR, Physical Layer Procedures for Data"; 3GPP TS 38.321 v17.3.0, "NR; Medium Access Control (MAC) protocol specification"; 3GPP TS 38.331 v17.3.0, "NR; Radio Resource Control (RRC) Protocol Specification."

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
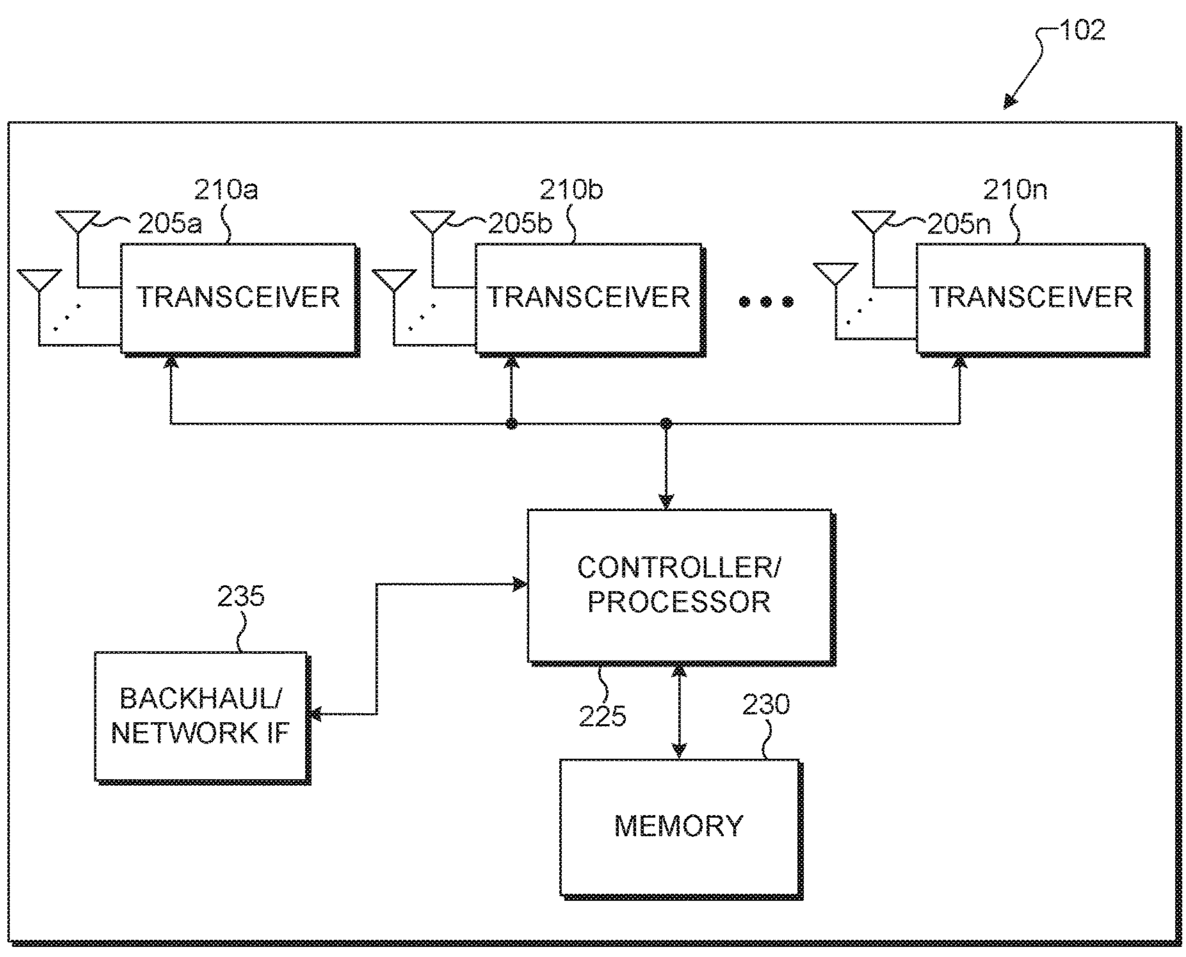
FIG. 2 illustrates an example gNodeB (gNB) according to embodiments of the present disclosure.
Figure 3:
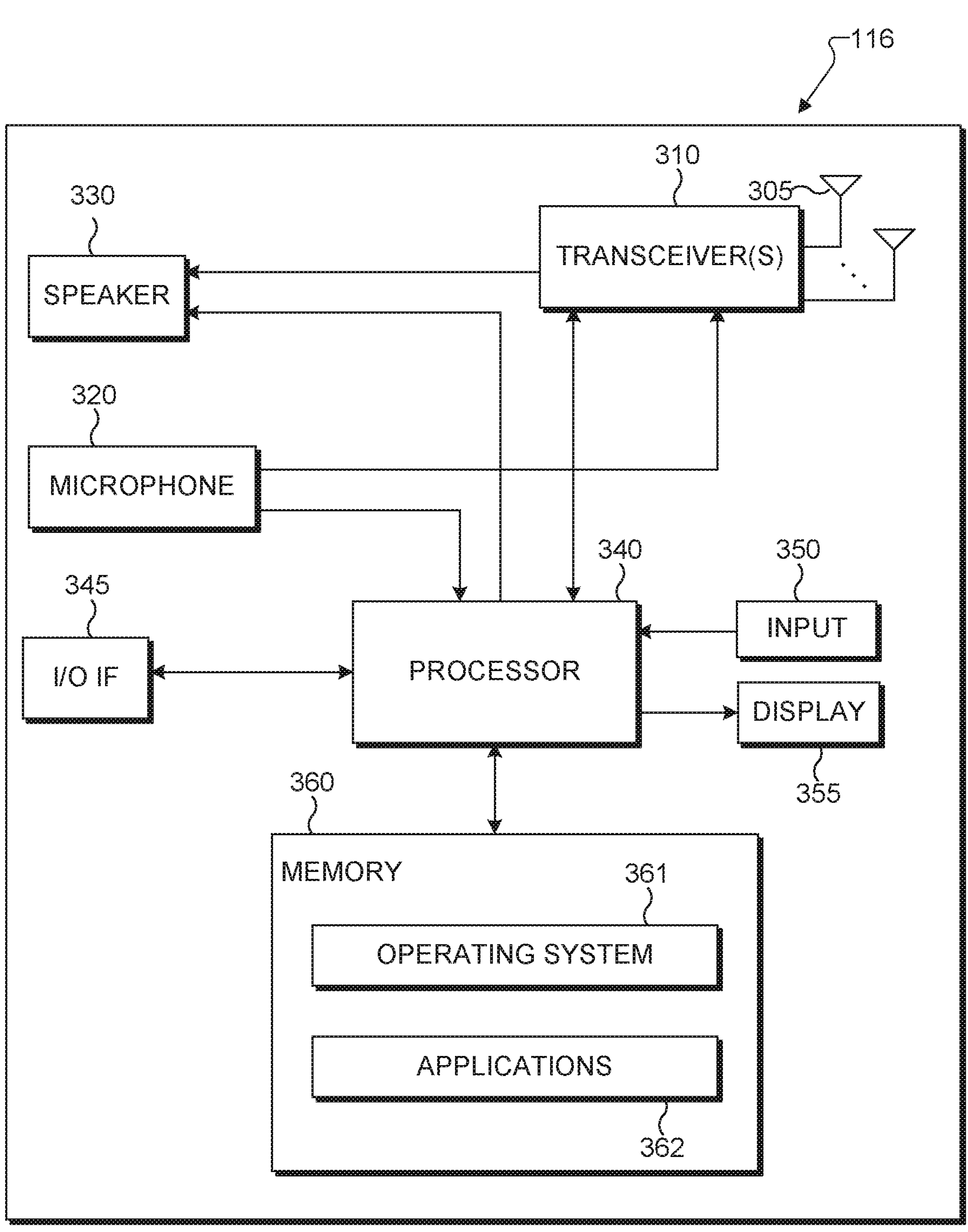
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

As described in more detail below, one or more of the UEs 111-116 include circuitry, programing, or a combination thereof for supporting increasing spectral efficiency and reducing latency for random data arrival times. In certain embodiments, one or more of the gNBs 101-103 include circuitry, programing, or a combination thereof for supporting increasing spectral efficiency and reducing latency for random data arrival times.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for supporting increasing spectral efficiency and reducing latency for random data arrival times. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for increasing spectral efficiency and reducing latency for random data arrival times. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
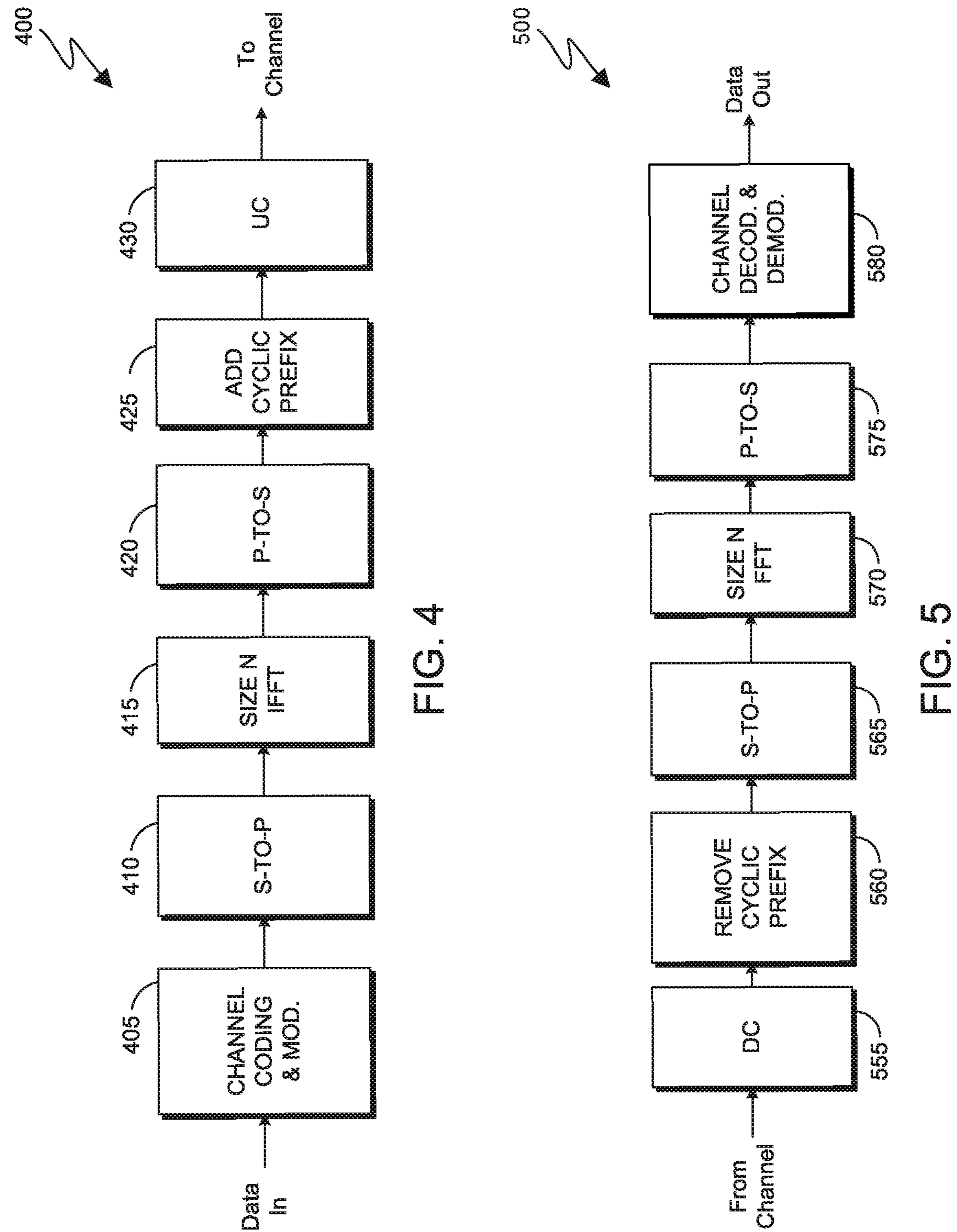
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. Furthermore, it will be understood that the receive path 500 can be implemented in one UE, and that the transmit path 400 can be implemented in another UE in case of device-2-device communication. In some embodiments, the receive path 500 is configured to support increasing spectral efficiency and reducing latency for random data arrival times.as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the gNBs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In the following, an italicized name for a parameter implies that the parameter is provided by higher layers.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu}\cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level within a control resource set (CORESET).

A PDSCH transmission is scheduled by a DCI format or is semi-persistently scheduled (SPS) as configured by higher layers and activated by a DCI format. SPS PDSCH receptions can be according to one or more configurations for corresponding parameters that are provided by higher layers as described in TS 38.331 v17.0.0 "NR; Radio Resource Control (RRC) protocol specification". A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

A gNB transmits one or more of multiple types of RS including channel state information RS (CSI-RS) and demodulation RS (DMRS)—see also TS 38.211 v17.1.0 "NR; Physical channels and modulation". A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also TS 38.213 v17.1.0 "NR; Physical Layer Procedures for Control"). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also TS 38.331 v16.5.0 "NR; Radio Resource Control (RRC) Protocol Specification"). A DMRS is typically transmitted only within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also TS 38.211 v17.1.0 "NR; Physical channels and modulation"). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

A PUSCH transmission can be scheduled by a DCI format or be configured by higher layers and is then referred as configured grant (CG) PUSCH. A UE can be provided with multiple configurations for CG-PUSCH transmissions, as described in TS 38.214 v17.1.0 "NR; Physical layer procedures for data" and can select a configuration according to characteristics for a CG-PUSCH transmission such as a transport block size or a latency requirement.

UCI includes hybrid automatic repeat request acknowledgement (HARQ-ACK) information, indicating correct or incorrect decoding of transport blocks (TBs) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. HARQ-ACK information is either a positive acknowledgement (ACK) when a TB decoding is correct or a negative acknowledgement (NACK) when a TB decoding is incorrect. A UE may need to report HARQ-ACK information in response to correct or incorrect decoding of a DCI format together with HARQ-ACK information in response to correct of incorrect decoding of TBs. For example, the HARQ-ACK information for a decoding of a DCI format can be for a DCI format indicating an SPS PDSCH activation/release or for a DCI format indicating a dormant/non-dormant BWP for a cell from a group of cells, and so on, as described in TS 38.213 v17.4.0 "NR; Physical layer procedures for control". A UE multiplexes HARQ-ACK information in a slot indicated by a value of PDSCH-to-HARQ_feedback timing indicator field in the DCI format, from a set of slot timing values $K_1$, or indicated by higher layers.

A UE transmits a PUCCH with a (positive) SR to indicate that it has data for transmission in the buffer. Upon detection of the PUCCH with the SR, a gNB can schedule a PUSCH for the UE to also provide a buffer status report (BSR) in order for the gNB to obtain information for the amount of data that the UE needs to provide. That procedure introduces additional latency in the UE providing the data, especially for unpaired spectrum operation (TDD), as the UE needs to transmit a PUSCH to provide a BSR prior to the gNB being able to schedule the UE with the required resources that the gNB can determine based on the BSR.

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. Multicast (or groupcast) PDSCH receptions can occur in a common frequency region for a group of UEs, wherein the common frequency region is within an active DL BWP for each UE from the group of UEs. DL transmissions from a gNB and UL transmissions from a UE can be based on an orthogonal frequency division multiplexing (OFDM) waveform including a variant using DFT precoding that is known as DFT-spread-OFDM (see also TS 38.211 v17.4.0 "NR; Physical channels and modulation").

Figures 6, 7:
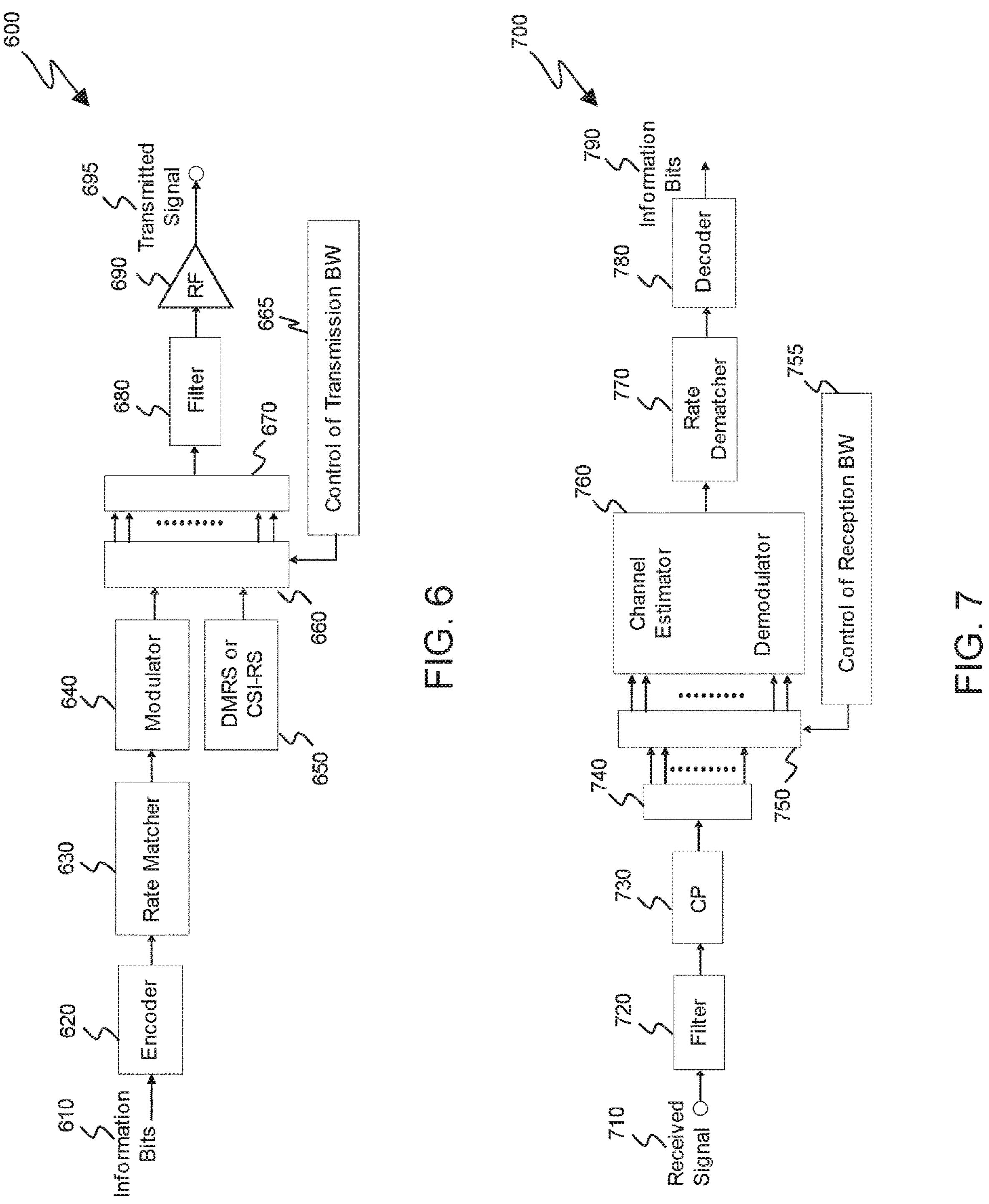
FIG. 6 illustrates an example transmitter structure using orthogonal frequency-division multiplexing (OFDM) according to embodiments of the present disclosure.
FIG. 7 illustrates an example receiver structure using OFDM according to embodiments of the present disclosure.

FIG. 6 illustrates an example transmitter structure using OFDM 600 according to embodiments of the present disclosure. The embodiment of the transmitter structure using OFDM 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter structure using OFDM 600.

As shown in FIG. 6, information bits, such as DCI bits or data bits 610, are encoded by encoder 620, rate matched to assigned time/frequency resources by rate matcher 630, and modulated by modulator 640. Subsequently, modulated encoded symbols and DMRS or CSI-RS 650 are mapped to SCs 660 by SC mapping unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit 695.

FIG. 7 illustrates an example receiver structure using OFDM 700 according to embodiments of the present disclosure. The embodiment of the receiver structure using OFDM 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the receiver structure using OFDM 700.

As shown in FIG. 7, a received signal 710 is filtered by filter 720, a CP removal unit removes a CP 730, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

An important application for wireless communications includes augmented reality (AR), cloud gaming, and virtual reality (VR) that are collectively referred to as XR. XR traffic includes video traffic and represents a challenging scenario for a network to support due to the requirements of very large data rates, such as 30-60 Mbps for video traffic, with low end-to-end latency at the physical layer, also referred to as packet delay budget (PDB), such as 10 msec.

A PUSCH transmission can be scheduled by a DCI format or be configured by higher layers and is then referred as configured grant (CG) PUSCH. Despite an inability for dynamic link adaptation, CG-PUSCH transmissions can provide a capacity improvement by facilitating achieving a PDB target at the expense of worse spectral efficiency compared to PUSCH transmissions scheduled by a DCI format (UL grant). In case of small PDB, CG-PUSCH transmissions avoid a delay associated with the transmission of a PUCCH providing a SR followed by the transmission of a PDCCH providing an UL grant that schedules a PUSCH transmission. A UE can be provided multiple CG-PUSCH transmission occasions in a period of a single CG-PUSCH configuration for example based on the parameters cg-nrofSlots and cg-nrofPUSCH-InSlot as described in TS 38.214 v17.4.0 "NR; Physical layer procedures for data".

XR traffic from a UE can include multiple data flows each having respective characteristics such as a required data rate for and a packet delay budget (PDB). The communication can be based on packet data unit (PDU) sets that include a number of PDUs with information generated at the application level, such as a frame/video slice. Individual IP packets of the PDU set are inter-dependent and need to be received within the PDB for the PDU set. In some implementations, all PDUs are needed by the application layer and an entire PDU set can be discarded if at least one PDU cannot be delivered within the PDB, while in other implementations error concealment can apply for up to a certain number of lost PDUs but the order of PDUs is then also relevant.

For example, XR traffic can include video frames and pose/control information that describes a state of a viewer, also referred to as field of view (FoV), of the XR scene as tracked by the UE and can be used by the gNB scheduler to adjust data rates of XR traffic. Pose/control information is periodic, for example with 4 msec or 5 msec period, typically has a small TB size, and that makes pose/control information suitable to be provided by CG-PUSCH transmissions. Video traffic is also periodic with a 16.67 msec or a 33.33 msec period but is also characterized by a jitter, mainly due to the video codec, that can be described by a distribution such as a truncated Gaussian distribution with variance of 4 msec. Video traffic also has small PDB requirements such as 20 msec or 30 msec, and requires large data rates such as 30 Mbps. To facilitate achieving the PDB target, CG-PUSCH transmissions may also apply for video frames in order to avoid a scheduling latency associated with a PUCCH transmission with positive SR by the UE to request PUSCH scheduling and a subsequent PDCCH transmission by the gNB providing a DCI format for the PUSCH scheduling prior to the UE transmitting a PUSCH. Further, in order to achieve the large data rates within the PDB target for video frames while considering a maximum transmission power available at the UE, multiple CG-PUSCH transmissions are required over successive slots having enough symbols to accommodate the CG-PUSCH transmissions, such as UL slots of a TDD UL-DL configuration.

One issue resulting from a UE having consecutive CG-PUSCH transmissions for video traffic and frequent CG-PUSCH transmissions with pose/control information is that such CG-PUSCH transmissions can be in overlapping symbols (time overlapping). Such collisions among transmissions by a UE exist in general but are particularly acute in a network operating with TDD. For example, for a DL-heavy TDD UL-DL configuration, such as a periodic configuration of DDDDU slots, collisions of transmissions of different channels by a UE may always occur as they may always need to be in a same slot. One approach to resolve collisions among CG-PUSCH transmissions is to define rules for a UE to drop some of the overlapping CG-PUSCH transmissions. That can be sufficient when such overlapping does not occur for multiple consecutive transmission occasions for the CG-PUSCH transmissions that the UE would drop. Another approach is to define rules for multiplexing information from a CG-PUSCH transmission that the UE would drop, such as pose/control information, in a CG-PUSCH transmission that the UE would not drop, such as for video information. Yet another approach is to avoid such collisions by network configuration of corresponding CG-PUSCH transmissions.

Another issue resulting from a UE having time-overlapping PUSCH transmissions in a slot is a need to define a multiplexing procedure for UCI in one or more PUCCH transmissions that overlap in time with the PUSCH transmissions.

For multiple CG-PUSCH transmission occasions (TOs) in a period of a single CG-PUSCH configuration and for periodic traffic generation such as for video frames in XR, a UE can determine a size of a frame/PDU in a period when the UE generates the frame. The UE can then determine, based on time-frequency resources, MCS, and number of layers for a CG-PUSCH transmission, a number of CG-PUSCH TOs with CG-PUSCH transmission in the period that are required to provide the frame/PDU with the size to a serving gNB. For example, for a total of 8 CG-PUSCH TOs in a transmission period, a small video frame/PDU may require CG-PUSCH transmissions in only 2 CG-PUSCH TOs while a large video frame/PDU may require CG-PUSCH transmissions in 8 CG-PUSCH TOs. To facilitate resource utilization and thereby improve spectral efficiency on a cell, the UE can inform a serving gNB the number of CG-PUSCH TOs in the period that the UE would use to transmit CG-PUSCHs. The CG-PUSCH TOs can be consecutive in order to minimize a latency for providing a video frame or, in general, a data packet. The UE can provide that information in the form of UCI that is multiplexed in a CG-PUSCH transmission. For brevity, the UCI is referred to as nrCG-UCI. Then, as the UE would not transmit CG-PUSCHs in CG-PUSCH TOs that are after the CG-PUSCH TOs required for providing a data packet in a period, the gNB can use the corresponding time-frequency resources to schedule other traffic. For functional and efficient support of the aforementioned functionality, the following design aspects need to be defined.

A first design aspect is to define procedures for a UE to provide nrCG-UCI such as when the UE provides nrCG-UCI, the information that nrCG-UCI provides, and the multiplexing of nrCG-UCI with other UCI in a CG-PUSCH.

A second design aspect is to define procedures for a UE to determine nrCG-UCI when the UE cancels CG-PUSCH transmissions for a number of CG-PUSCH TOs where the UE would transmit respective TBs, for example because corresponding time resources overlap with another PUSCH transmission scheduled by a serving gNB or because they overlap with DL symbols in case of TDD operation.

A third design aspect is to enable utilization of time-frequency resources for CG-PUSCH transmissions by a UE in a period prior to a CG-PUSCH TO where the UE transmits a first CG-PUSCH. For example, due to jitter in a video frame generation time at the UE, the UE may not have any data to transmit in first few CG-PUSCH TOs in a period and a typically large number of time-frequency resources on a cell may then remain unutilized, thereby substantially reducing spectral efficiency on the cell.

A fourth design aspect is a selection of a PUSCH for multiplexing nrCG-UCI when a UE simultaneously transmits more than one PUSCHs on respective more than one cells. In general, as described in TS 38.213 v17.4.0, a UE determines a PUSCH for UCI multiplexing, among candidate PUSCHs, as follows:

- If the candidate PUSCHs that include first PUSCHs that are scheduled by DCI formats and second PUSCHs that are not scheduled by DCI formats, and the UE would multiplex UCI in one of the candidate PUSCHs, and the candidate PUSCHs fulfil conditions for UCI multiplexing, the UE multiplexes the UCI in a PUSCH from the first PUSCHs.
- If the UE would multiplex UCI in one of the candidate PUSCHs and the UE does not multiplex aperiodic CSI in any of the candidate PUSCHs, the UE multiplexes the UCI in a PUSCH of the serving cell with the smallest index subject to conditions for UCI multiplexing being fulfilled. If the UE transmits more than one PUSCHs in the slot on the serving cell with the smallest index that fulfil the conditions for UCI multiplexing, the UE multiplexes the UCI in the earliest PUSCH that the UE transmits in the slot.

Therefore, the UE prioritizes multiplexing of UCI in PUSCH transmissions that are scheduled by DCI formats over CG-PUSCH transmissions. However, that rule is not appropriate for multiple CG-PUSCH transmission occasions in a period of a single CG-PUSCH configuration as some of the earliest CG-PUSCH TOs may not be associated with any CG-PUSCH transmission because the UE may not have yet generated a corresponding TB. Then, a serving gNB cannot know whether nrCG-UCI is included in a PUSCH transmission scheduled by a DCI format on another cell.

Also, as described in TS 38.213 v17.4.0, if a UE is provided simultaneousPUCCH-PUSCH and would transmit a PUCCH with a first priority index and PUSCHs with a second priority index that is different than the first priority index, where the PUCCH and the PUSCHs overlap in time can simultaneously transmit the PUCCH and the PUSCHs [18, TS 38.306], the UE excludes the PUSCHs for resolving the time overlapping between the PUCCH and PUSCHs, where the timeline conditions are not required for the excluded PUSCHs. For example, when the UE would transmit a PUCCH and a PUSCH on cells operating on different frequency bands, and the UE is configured for simultaneous PUCCH and PUSCH transmissions, and the PUCCH and PUSCH transmissions have different priorities, the UE multiplexes the UCI in the PUCCH and transmits both the PUCCH and the PUSCH. Similar to multiplexing nrCG-UCI in a PUSCH transmission scheduled by a DCI format, a serving gNB may not be able to determine whether the UE includes nrCG-UCI in a PUCCH transmission as the UE may or may not have a CG-PUSCH for transmission that overlaps in time with the PUCCH.

Various embodiments of the present disclosure recognize a need to define a UE procedure for providing nrCG-UCI that indicates a number of CG-PUSCH TOs where the UE transmits CG-PUSCHs of a CG-PUSCH configuration with more than one CG-PUSCH TOs in a transmission period.

Various embodiments of the present disclosure recognize a need to define a UE procedure for indicating a number of CG-PUSCH TOs where the UE transmits CG-PUSCHs of a CG-PUSCH configuration with more than one CG-PUSCH TOs in a transmission period when the UE cancels CG-PUSCH transmissions in some CG-PUSCH TOs.

Various embodiments of the present disclosure recognize a need to enable utilization of CG-PUSCH TOs of a CG-PUSCH configuration with more than one CG-PUSCH TOs in a transmission period that are not used for CG-PUSCH transmissions and are prior to a first CG-PUSCH TO that is used for a CG-PUSCH transmission.

Various embodiments of the present disclosure recognize a need to define a UE procedure for multiplexing an indication for a number of CG-PUSCH TOs where the UE would transmit CG-PUSCHs of a CG-PUSCH configuration with more than one CG-PUSCH TOs in a transmission period when the UE transmits more than one channels that overlap in time.

Various embodiments of the present disclosure recognize a need to define a UE procedure for resolving time-overlapping among CG-PUSCH transmissions.

Various embodiments of the present disclosure recognize a need to enable CG-PUSCH configurations that avoid collisions among CG-PUSCH transmissions corresponding to different CG-PUSCH configurations.

Various embodiments of the present disclosure recognize a need to define a UE procedure for multiplexing information from a first CG-PUSCH into a second PUSCH, dropping transmission of the first CG-PUSCH, and transmitting the second PUSCH.

Various embodiments of the present disclosure recognize a need to define a UE procedure for multiplexing UCI from one or more PUCCH transmissions that overlap in time with more than one PUSCH transmissions that also overlap in time.

Accordingly, various embodiments of the present disclosure provide mechanisms that define a UE procedure for providing nrCG-UCI that indicates a number of CG-PUSCH TOs where the UE transmits CG-PUSCHs of a CG-PUSCH configuration with more than one CG-PUSCH TOs in a transmission period.

Various embodiments of the present disclosure provide mechanisms that define a UE procedure for indicating a number of CG-PUSCH TOs where the UE transmits CG-PUSCHs of a CG-PUSCH configuration with more than one CG-PUSCH TOs in a transmission period when the UE cancels CG-PUSCH transmissions in some CG-PUSCH TOs Various embodiments of the present disclosure provide mechanisms for enabling utilization of CG-PUSCH TOs of a CG-PUSCH configuration with more than one CG-PUSCH TOs in a transmission period that are not used for CG-PUSCH transmissions and are prior to a first CG-PUSCH TO that is used for a CG-PUSCH transmission.

Various embodiments of the present disclosure provide mechanisms that define a UE procedure for multiplexing an indication for a number of CG-PUSCH TOs where the UE transmits CG-PUSCHs of a CG-PUSCH configuration with more than one CG-PUSCH TOs in a transmission period when the UE transmits more than one channels that overlap in time.

Various embodiments of the present disclosure provide mechanisms that define a UE procedure for resolving time-overlapping among CG-PUSCH transmissions.

Various embodiments of the present disclosure provide mechanisms for enabling CG-PUSCH configurations that avoid collisions among CG-PUSCH transmissions corresponding to different CG-PUSCH configurations.

Various embodiments of the present disclosure provide mechanisms that define a UE procedure for multiplexing information from a first CG-PUSCH into a second PUSCH, dropping transmission of the first CG-PUSCH, and transmitting the second PUSCH.

Various embodiments of the present disclosure provide mechanisms that define a UE procedure for multiplexing UCI from one or more PUCCH transmissions that overlap in time with more than one PUSCH transmissions that also overlap in time.

The term "higher layers" is used to denote control information that a UE is provided in a PDSCH reception, such as radio resource control (RRC) or a medium access control (MAC) control element (CE).

In one embodiment, mechanisms and procedures for a UE to indicate to a serving gNB a number of CG-PUSCH TOs of a CG-PUSCH configuration in a transmission period that the UE will use to transmit CG-PUSCHs are considered.

A UE can provide nrCG-UCI in a CG-PUSCH transmission to indicate to a serving gNB a number of CG-PUSCH TOs of a CG-PUSCH configuration in a transmission period that the UE would use to transmit CG-PUSCHs. The UE can provide nrCG-UCI in each CG-PUSCH transmission. A number of bits for nrCG_UCI can be indicated to the UE from a serving gNB by RRC signaling. As a number of bits required to provide nrCG-UCI is typically orders of magnitude smaller than a number of bits for a TB in a CG-PUSCH, a corresponding overhead is practically negligible. For example, considering TDD operation and a small PDB for a UE to provide a video frame, a total number of CG-PUSCH TOs in a transmission period is relatively small, such as smaller than or equal to 8 or 16 and, if an indication is for consecutive TOs, nrCG-UCI can be represented by 4 bits or less. Conversely, for data rates of tens of Mbps, a size of a TB in a CG-PUSCH transmission is in the order of tens of thousands of bits.

In a first approach, nrCG-UCI can be same in each CG-PUSCH TO and indicate a total number $N_{total,tx}$ of CG-PUSCH TOs with CG-PUSCH transmissions. The first approach considers that a serving gNB can determine, based on a determination of a corresponding CG-PUSCH reception, a first of the CG-PUSCH TOs that includes a CG-PUSCH transmission from the UE for the CG-PUSCH configuration with more than one CG-PUSCH TOs in a transmission period. The gNB can therefore unambiguously determine the consecutive CG-PUSCH TOs that include CG-PUSCH transmissions based on the indication of the total number of CG-PUSCH TOs with CG-PUSCH transmissions from the UE.

An advantage of the first approach is that by having a same value for nrCG-UCI in each CG-PUSCH transmission, errors in the determination of the nrCG-UCI value can reduced at the gNB and the gNB may also combine respective soft values of nrCG-UCI from different CG-PUSCH receptions in a period to improve reception reliability of the nrCG-UCI in later CG-PUSCH receptions. For example, for $N_{total}=4$ CG-PUSCH TOs of a CG-PUSCH configuration in a transmission period and for an indication of consecutive TOs, a nrCG-UCI represented by 2 bits ($\log_2(N_{total})$), and a total number of $N_{total,tx}=2$ CG-PUSCH TOs with CG-PUSCH transmissions, nrCG-UCI can indicate $N_{total,tx}=2$ in the first and the second of the $N_{total,tx}=2$ CG-PUSCH TOs with CG-PUSCH transmissions.

In a second approach, nrCG-UCI can indicate a number $N_{total,rem}$ of remaining/subsequent CG-PUSCH TOs (including a current CG-PUSCH TO) with CG-PUSCH transmissions in a transmission period. An advantage of the second approach is that it does not require a serving gNB to accurately detect a presence of previous CG-PUSCH transmissions from a UE in CG-PUSCH TOs of a CG-PUSCH configuration in a transmission period. Similar to the first approach, another advantage of the second approach by including nrCG-UCI in each CG-PUSCH transmission is that a serving gNB can determine a number of remaining/subsequent CG-PUSCH TOs with CG-PUSCH transmissions when the gNB does not correctly receive/detect nrCG-UCI in previous CG-PUSCH transmissions for the CG-PUSCH configuration with more than one CG-PUSCH TOs in a transmission period. For example, for $N_{total}=4$ CG-PUSCH TOs of a CG-PUSCH configuration in a transmission period and for a nrCG-UCI indicating a number of consecutive CG-PUSCH TOs, a nrCG-UCI represented by 2 bits ($\log_2(N_{total})$), and for a total number of $N_{total,tx}=2$ CG-PUSCH TOs with CG-PUSCH transmissions, nrCG-UCI can indicate $N_{total,rem}$=2 in the first CG-PUSCH TO with CG-PUSCH transmission and indicate $N_{total,rem}$=1 in the second CG-PUSCH TO with CG-PUSCH transmission. It is also possible that a current CG-PUSCH transmission is not counted in the nrCG-UCI for remaining CG-PUCCH TOs with CG-PUSCH transmissions. Then, in the above example, nrCG-UCI can indicate $N_{total,rem}$=1 in the first CG-PUSCH TO with CG-PUSCH transmission and indicate $N_{total,rem}$=0 in the second CG-PUSCH TO with CG-PUSCH transmission.

Figure 8:
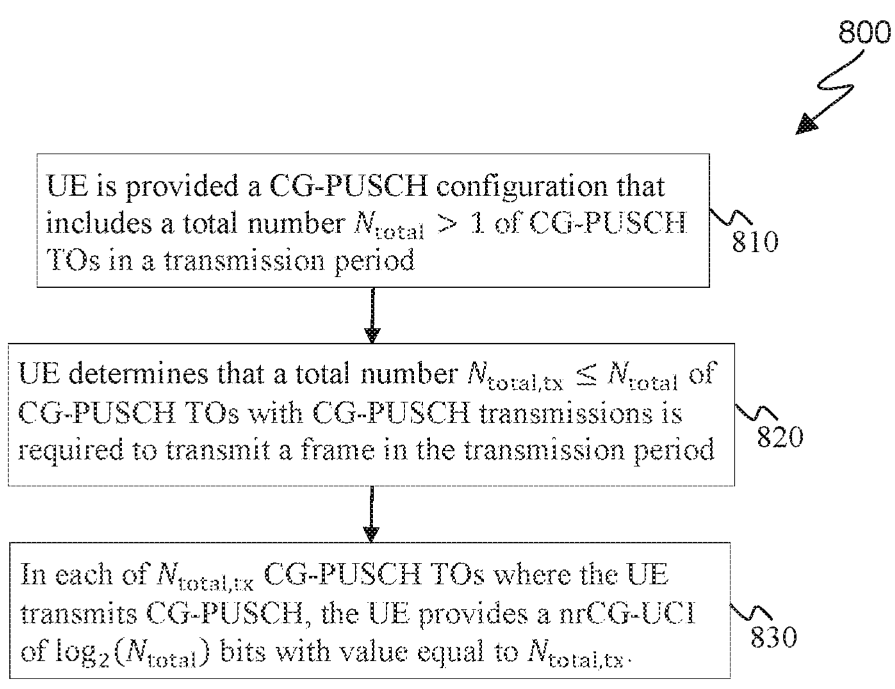
FIG. 8 illustrates an example procedure for a UE to indicate a total number of CG-PUSCH TOs, of a CG-PUSCH configuration in a transmission period, that the UE uses to transmit CG-PUSCHs according to the disclosure.

FIG. 8 illustrates an example procedure 800 for a UE to indicate a total number of CG-PUSCH TOs, of a CG-PUSCH configuration in a transmission period, that the UE uses to transmit CG-PUSCHs according to the disclosure. The procedure 800 may be performed by a UE (e.g., any of the UEs 111-119 as illustrated in FIG. 1). An embodiment of the UE procedure 800 shown in FIG. 8 is for illustration only and does not limit the scope of this disclosure to any particular implementation.

A UE is provided a CG-PUSCH configuration that includes $N_{total}$>1 CG-PUSCH TOs in a transmission period 810. Based, for example, on time-frequency resources, MCS, and number of layers for a CG-PUSCH transmission for the CG-PUSCH configuration, the UE determines that $N_{total,tx} \leq N_{total}$ of CG-PUSCH TOs with CG-PUSCH transmissions are required for the UE to transmit a frame in the transmission period 820. In each of the $N_{total,tx}$ CG-PUSCH TOs where the UE transmits CG-PUSCH, the UE provides a nrCG-UCI of $\log_2(N_{total})$ bits with value equal to $N_{total,tx}$ 830.

Figure 9:
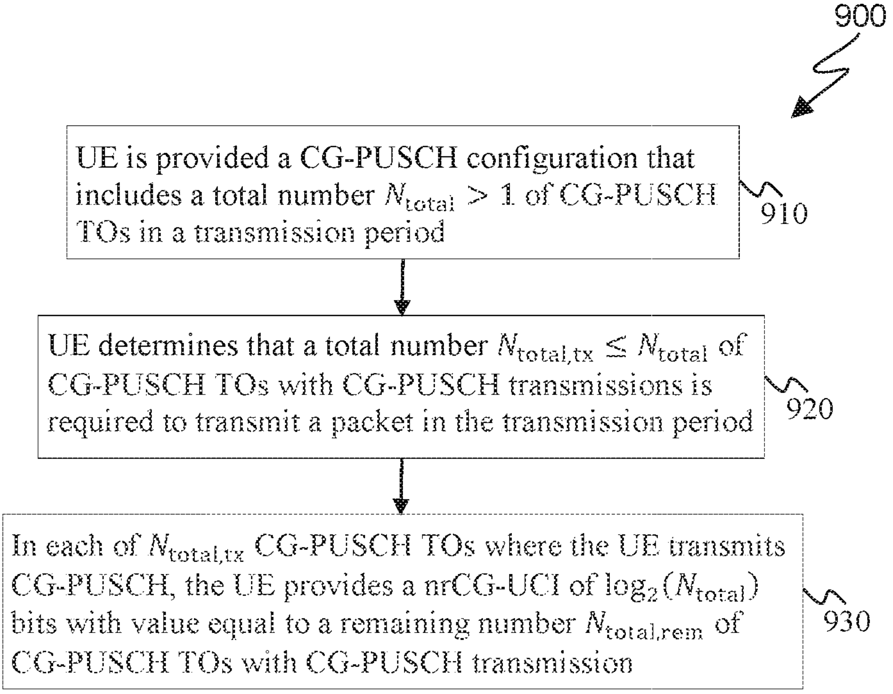
FIG. 9 illustrates an example procedure for a UE to indicate a remaining number of CG-PUSCH TOs of a CG-PUSCH configuration in a transmission period that the UE uses to transmit CG-PUSCHs according to the disclosure.

FIG. 9 illustrates an example procedure 900 for a UE to indicate a remaining number of CG-PUSCH TOs of a CG-PUSCH configuration in a transmission period that the UE uses to transmit CG-PUSCHs according to the disclosure. The procedure 900 may be performed by a UE (e.g., any of the UEs 111-119 as illustrated in FIG. 1). An embodiment of the UE procedure 900 shown in FIG. 9 is for illustration only and does not limit the scope of this disclosure to any particular implementation.

A UE is provided a CG-PUSCH configuration that includes $N_{total}$>1 of CG-PUSCH TOs in a transmission period 910. Based, for example, on time-frequency resources, MCS, and number of layers for a CG-PUSCH transmission for the CG-PUSCH configuration, the UE determines that $N_{total,tx} \leq N_{total}$ of CG-PUSCH TOs with CG-PUSCH transmissions is required to transmit a frame in the transmission period 920. In each of the $N_{total,tx}$ CG-PUSCH TOs where the UE transmits CG-PUSCH, the UE provides nrCG-UCI of $\log_2(N_{total})$ bits with value equal to a remaining number $N_{total,rem}$ of CG-PUSCH TOs with CG-PUSCH transmissions 930.

A UE can also be indicated by a serving gNB to suspend transmissions in a transmission period for CG-PUSCH TOs of a CG-PUSCH configuration with more than one CG-PUSCH TOs in the transmission period. For example, after obtaining an indication of a required number of CG-PUSCH TOs with CG-PUSCH transmissions, a serving gNB can estimate a size of a video frame that the UE needs to provide in the transmission period based on time-frequency resources, MCS, and number of spatial layers for the CG-PUSCH transmissions. For example, the UE can provide a buffer status report (BSR) in a CG-PUSCH transmission to indicate a remaining size of a video frame. The serving gNB can then schedule subsequent PUSCH transmissions from the UE for the video frame in order to perform link adaptation and improve spectral efficiency, particularly considering that resources required for a PDCCH transmission with a DCI format of a few tens of bits is several orders of magnitude smaller than resources required for a PUSCH transmission with a TB size of tens of thousands of bits.

In a first approach, when a UE receives a PDCCH providing a DCI format that schedules an initial transmission of a transport block in a PUSCH that is over symbols that include symbols of a CG-PUCCH TO in a slot, the UE considers that the gNB released the CG-PUSCH configuration for the transmission period and suspends subsequent CG-PUSCH transmissions in the CG-PUCCH TOs in the transmission period. The scheduled PUSCH transmission can be of same priority as the CG-PUSCH transmission.

In a second approach, a DCI format includes a field, for example comprising of 1 bit, that indicates whether or not the CG-PUSCH configuration is released for the transmission period. For example, the DCI format can be one scheduling a PUSCH transmission. The DCI format can include a priority indicator field with value indicating a same priority as for the CG-PUSCH transmissions for the CG-PUSCH configuration.

In one embodiment, mechanisms and procedures are considered for a UE to count CG-PUSCH TOs with CG-PUSCH transmissions, in a period of a single CG-PUSCH configuration, when the UE cancels some CG-PUSCH transmissions in respective CG-PUSCH TOs and postpones providing respective TBs in CG-PUSCH transmissions in subsequent CG-PUSCH TOs.

A serving gNB may not correctly receive a first TB for a HARQ process in a CG-PUSCH transmission from a UE. In such case, the gNB can transmit to the UE a PDCCH that provides a DCI format scheduling a PUSCH transmission that includes the first TB for the HARQ process, typically with a different redundancy version (RV) for the UE to provide again the first TB. The PUSCH transmission can be in symbols of a slot that overlap with symbols of a CG-PUSCH TO that the UE previously indicated, for example via nrCG-UCI, to be used for a CG-PUSCH transmission with a second TB. Then, the UE transmits the PUSCH with the first TB, cancels the CG-PUSCH transmission with the second TB in the slot, and provides the second TB in a CG-PUSCH transmission in a later CG-PUSCH TO such as a next CG-PUSCH TO where the UE can transmit a CG-PUSCH.

A CG-PUSCH transmission in a slot can also include symbols that are indicated to the UE, or determined by the UE, to be DL symbols, for example based on RRC signaling or based on an indication by a DCI format such as DCI format 2_0 as described in TS 38.213 v17.4.0. Then, subject to applicable timeline conditions, when any, the UE cancels the CG-PUSCH transmission in the slot and provides a corresponding TB in a CG-PUSCH transmission in a later CG-PUSCH TO, such as a next CG-PUSCH TO, where the UE can transmit a CG-PUSCH. When the UE is aware in advance, such as based on information provided by higher layers, that the UE needs to cancel a CG-PUSCH transmission in a slot, the UE may or may not count a corresponding CG-PUSCH TO in the number of CG-PUSCH TOs that the UE indicates by nrCG-UCI to be used for CG-PUSCH transmissions. A corresponding UE behavior can be defined in the specifications of the system operation.

In general, there can also be conditions where a UE indicates, for example via nrCG-UCI, that a CG-PUSCH TO is to be used for a CG-PUSCH transmission and the UE needs to subsequently cancel the CG-PUSCH transmission in the CG-PUSCH TO based on a determination from contents of a DCI format. For example, the DCI format can schedule a PUSCH transmission with a TB for a HARQ process that the UE provided in a previous CG-PUSCH transmission, or with a new TB for a another HARQ process, that includes symbols of the CG-PUSCH transmission in the CG-PUSCH TO. For example, when the CG-PUSCH TO includes flexible symbols, a DCI format 2_0 can indicate that those flexible symbols are DL symbols. As CG-PUSCH transmissions provide new TBs, a UE needs to provide a TB from a canceled CG-PUSCH transmission at a CG-PUSCH TO in a CG-PUSCH transmission at a later CG-PUSCH TO. Then, a UE procedure needs to be defined for interpreting/processing a previous indication by the UE for a number of consecutive CG-PUSCH TOs with CG-PUSCH transmissions.

In a first approach, the UE does not consider a CG-PUSCH TO where a UE cancels a CG-PUSCH transmission due to an indication by a DCI format as being included in the number of consecutive CG-PUSCH TOs that the UE indicates to be used for CG-PUSCH transmissions. For example, when a number of CG-PUSCH TOs of a CG-PUSCH configuration in a transmission period is 8, the UE indicates, for example via nrCG-UCI, that the third and fourth CG-PUSCH TOs are to be used for CG-PUSCH transmissions, and the UE cancels the CG-PUSCH transmission in the fourth CG-PUSCH TO, the UE does not count the fourth CG-PUSCH TO. The UE provides a TB associated with the canceled CG-PUSCH transmission in an earliest of the remaining CG-PUSCH TOs where the UE can transmit the CG-PUSCH. Equivalently, the UE considers only valid CG-PUSCH TOs in the number of indicated CG-PUSCH TOs for CG-PUSCH transmissions where a valid CG-PUSCH TO is a CG-PUSCH TO where the UE can transmit the CG-PUSCH. Further, an indication of CG-PUSCH TOs with CG-PUSCH transmission for a CG-PUSCH configuration in a transmission period can exclude invalid CG-PUSCH TOs as determined based on information provided to the UE by RRC signaling, such as for example for a TDD UL-DL configuration, as the UE can know in advance CG-PUSCH TOs that are invalid, for example because they include DL symbols as indicated by the TDD UL-DL configuration.

In a second approach, when the UE indicates remaining CG-PUSCH TOs with CG-PUSCH transmissions, for example via nrCG-UCI, the UE does not decrease/change a nrCG-UCI value for TOs in a CG-PUSCH when the UE cancels a number of consecutive previous CG-PUSCH transmissions due to corresponding CG-PUSCH TOs being invalid based on an indication by a DCI format. As both the gNB and the UE can have a same understanding of canceled CG-PUSCH transmissions, for which the UE provides corresponding TBs in subsequent CG-PUSCH transmissions, the gNB and the UE can maintain a common understanding of the CG-PUSCH TOs where the UE would transmit CG-PUSCHs.

Figure 10:
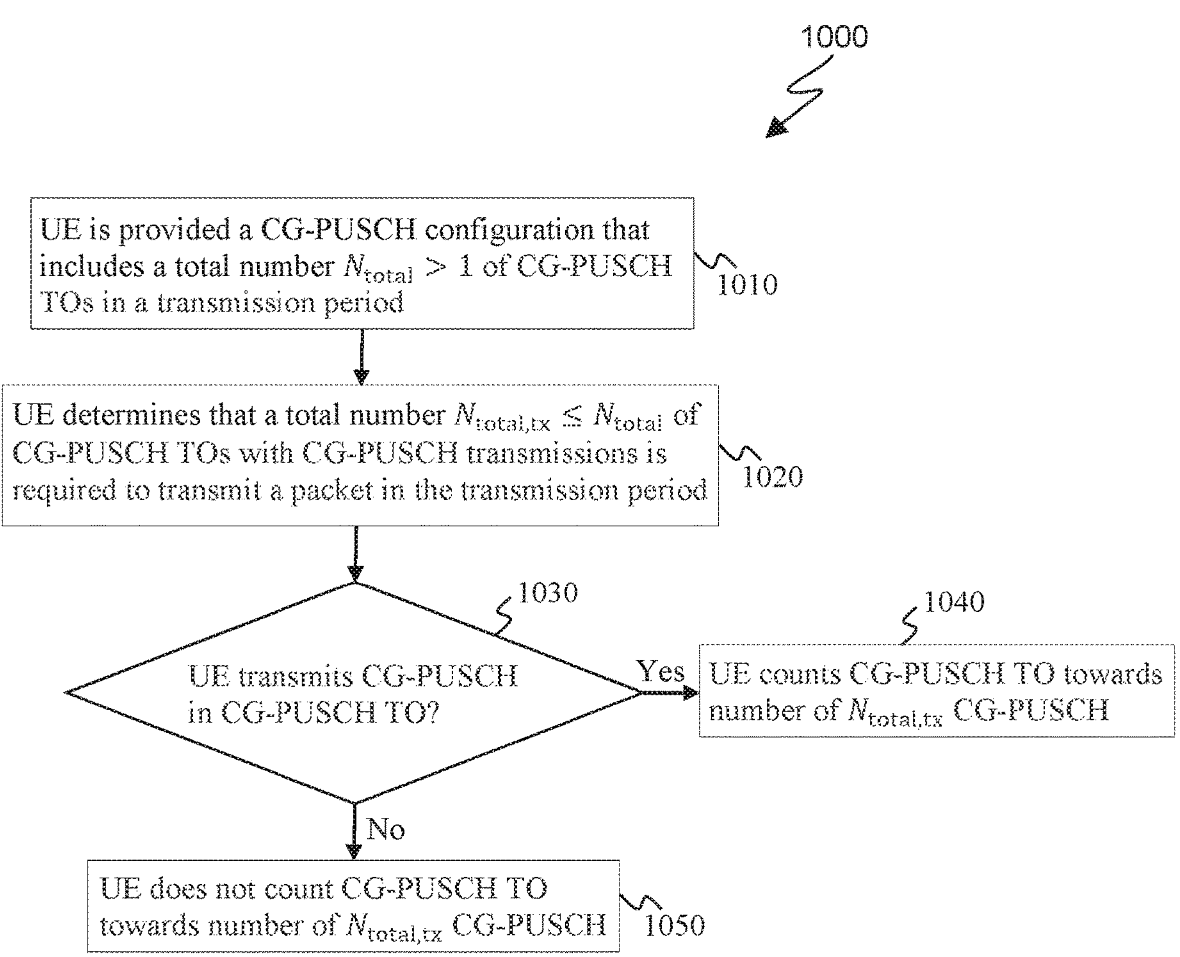
FIG. 10 illustrates an example procedure for a UE to count a number of CG-PUSCH TOs of a CG-PUSCH configuration in a transmission period that the UE uses to transmit CG-PUSCHs according to the disclosure.

FIG. 10 illustrates an example procedure 1000 for a UE to count a number of CG-PUSCH TOs of a CG-PUSCH configuration in a transmission period that the UE uses to transmit CG-PUSCHs according to the disclosure. The procedure 1000 may be performed by a UE (e.g., any of the UEs 111-119 as illustrated in FIG. 1). An embodiment of the UE procedure 1000 shown in FIG. 10 is for illustration only and does not limit the scope of this disclosure to any particular implementation.

A UE is provided a CG-PUSCH configuration that includes $N_{total}>1$ of CG-PUSCH TOs in a transmission period 1010. Based for example on time-frequency resources, MCS, and number of layers for a CG-PUSCH transmission for the CG-PUSCH configuration, the UE determines that $N_{total,tx}\leq N_{total}$ of CG-PUSCH TOs with CG-PUSCH transmissions is required to transmit a packet in the transmission period 1020. Based on information provided by a DCI format or by RRC signaling, the UE determines whether or not the UE can transmit a CG-PUSCH in a CG-PUSCH TO from the $N_{total,tx}$ CG-PUSCH TOs 1030. When the UE transmits the CG-PUSCH, the UE counts the CG-PUSCH TO towards the number of $N_{total,tx}$ CG-PUSCH TOs 1040; otherwise, the UE does not count the CG-PUSCH TO towards the number of $N_{total,tx}$ CG-PUSCH TOs 1050. Similar, when the UE indicates a remaining number $N_{total,rem}$ of CG-PUSCH TOs with a CG-PUSCH transmission, the UE does not count the CG-PUSCH TO towards the remaining number of CG-PUSCH TOs. For a determination based on information provided by RRC signaling, the UE can always exclude consideration of invalid CG-PUSCH TOs, such as CG-PUSCH TOs that overlap with DL symbols.

In addition to a counter, and with reference to CG-PUSCH transmissions on a serving cell, a nrCG-UCI can be a bitmap where, in a CG-PUSCH TO, the bitmap indicates the CG-PUSCH TO and a number of subsequent CG-PUSCH TOs where the UE may transmit a CG-PUSCH or where the UE will not transmit a CG-PUSCH. For example, the number of subsequent CG-PUSCH TOs, including the CG-PUSCH TO, can be equal to a size of the bitmap with a bit value of '0' indicating transmission and a bit value of '1' indicating no transmission, or the reverse, in a corresponding CG-PUSCH TO.

To enable a scheduler to utilize a CG-PUSCH TO where the UE indicated that the UE would not transmit a CG-PUSCH, in a first approach, it can be specified that the UE cannot later change such indication and cannot transmit the CG-PUSCH in the CG-PUSCH TO. However, that would also create a problem in case the UE needs to cancel a CG-PUSCH transmission in a CG-PUSCH TO that the UE indicated for CG-PUSCH transmission as the UE cannot then utilize for the CG-PUSCH transmission a CG-PUSCH TO for which the UE indicated that it would not transmit a CG-PUSCH. For example, the UE needs to cancel a CG-PUSCH transmission in a CG-PUSCH TO due to being scheduled by a DCI format a PUSCH transmission that provides a TB that a gNB incorrectly received in a previous CG-PUSCH. In general, a CG-PUSCH transmission in a valid CG-PUSCH TO can be cancelled due to various reasons such as, for example, the ones described in REF3 and REF4. In order to enable a UE to reclaim for a CG-PUSCH transmission a CG-PUSCH TO that the UE previously indicated that the UE would not transmit a CG-PUSCH while enabling a scheduler to utilize resources of a CG-PUSCH TO that the UE indicated to be free of a CG-PUSCH transmission, a timeline can be introduced from the end of a CG-PUSCH transmission (end of a first CG-PUSCH TO) where the UE indicates a switching of the status of a subsequent, second, CG-PUSCH TO from one not used for CG-PUSCH transmission to one used for CG-PUSCH transmission, to the beginning of the second CG-PUSCH TO. The UE shall not indicate such switching and shall not use the second CG-PUSCH TO for a CG-PUSCH transmission if a time between the end of first CG-PUSCH TO and the start of the second CG-PUSCH TO is smaller than (or equal to) the timeline; otherwise, the UE can indicate such switching and can use the second CG-PUSCH TO for the CG-PUSCH transmission. The timeline can be indicated to the UE by higher layers, such as for example by UE-specific radio resource control (RRC) signaling. The timeline can be in a number of absolute time units, such as milliseconds (msec), or in a number of slots for a subcarrier spacing corresponding to that of the CG-PUSCH transmission or for a reference subcarrier spacing such as 15 kHz. For example, assuming a timeline of 4 msec, a CG-PUSCH transmission in a first CG-PUSCH TO, and that a UE indicated no CG-PUSCH transmission in a second CG-PUSCH TO that starts 2 msec from the end of the first CG-PUSCH TO, and in a third CG-PUSCH TO that starts after 6 msec from the end of the first CG-PUSCH TO, the UE shall not indicate the second CG-PUSCH TO for CG-PUSCH transmission and can indicate the third CG-PUSCH TO for CG-PUSCH transmission.

In a second approach, the UE can determine based on its implementation a number of CG-PUSCH TOs to indicate for CG-PUSCH transmissions (or, to indicate for no CG-PUSCH transmissions). For example, the UE can perform such determination by accounting for potentially canceled CG-PUSCH transmissions. For example, the UE can determine or be indicated a target error rate for a TB transmitted in a CG-PUSCH and, based on a number of CG-PUSCH TOs needed for CG-PUSCH transmissions in a CG-PUSCH transmission period, the UE can determine a number of additional CG-PUSCH TOs to indicate for CG-PUSCH transmissions in the CG-PUSCH transmission period, for example by using the ceiling function for a number of expected incorrectly received TBs from the number of TBs the UE needs to provide in the CG-PUSCH transmission period. The UE can then indicate additional CG-PUSCH TOs as used for CG-PUSCH transmissions even though the UE would not need to use those additional CG-PUSCH TOs for CG-PUSCH transmissions if a TB is always correctly received or, in general, if the UE does not need to cancel a CG-PUSCH transmission.

In one embodiment, mechanisms and procedures for enabling utilization of CG-PUSCH TOs, that are not used for CG-PUSCH transmissions in a transmission period for a CG-PUSCH configuration, are considered.

A UE can include nrCG-UCI in CG-PUSCH transmissions that are associated with a first CG-PUSCH configuration with one CG-PUSCH TO in a first transmission period that is different than a second CG-PUSCH configuration with more than one CG-PUSCH TOs in a second transmission period and associated with the nrCG-UCI. For example, for XR applications, pose/control information can be provided by the first CG-PUSCH configuration with a single CG-PUSCH TO in a first period, such as 4 msec or 5 msec, and video frames can be provided by the second CG-PUSCH configuration with multiple CG-PUSCH TOs in a second period, such as 16 msec or 33 msec. Then, at least when CG-PUSCH transmissions for the first CG-PUSCH configuration are more frequent than for the second CG-PUSCH configuration and are deterministically occurring, those CG-PUSCH transmissions can be used to provide the nrCG-UCI in addition to or instead of providing nrCG-UCI in CG-PUSCH transmissions for the second CG-PUSCH configuration.

An advantage of providing nrCG-UCI associated with the second CG-PUSCH configuration in a CG-PUSCH transmission of the first CG-PUSCH configuration is that the UE can provide earlier an indication of CG-PUCCH TOs without CG-PUSCH transmissions for the second CG-PUSCH configuration so that a scheduler can reassign resources for unused CG-PUSCH TOs. The indication can also be provided prior to any CG-PUSCH transmission for the second CG-PUSCH configuration so that resources for CG-PUSCH TOs prior to the first CG-PUSCH TO with CG-PUSCH transmission for the second CG-PUSCH configuration can be utilized to schedule other traffic.

The indication of nrCG-UCI in a CG-PUSCH transmission of the first CG-PUSCH configuration, that is different than the second CG-PUSCH configuration associated with the nrCG-UCI, can indicate whether or not the UE would transmit in at least one of CG-PUSCH TOs for the second CG-PUSCH configuration that are prior to a next CG-PUSCH transmission for the first CG-PUSCH configuration. For example, for a total of $N_{total,int}=1$ CG-PUSCH TO of the second CG-PUSCH configuration between two consecutive CG-PUSCH transmissions for the first CG-PUSCH configuration, where the $N_{total,int}=1$ CG-PUSCH TO is after the earlier of the two consecutive CG-PUSCH transmissions, a nrCG-UCI of 1 bit can indicate whether or not the CG-PUSCH TO will be used for a CG-PUSCH transmission of the second CG-PUSCH configuration. In a first option, the $N_{total,int}=1$ CG-PUSCH TO can include the later of the two consecutive CG-PUSCH transmissions of the first CG-PUSCH configuration. In a second option, the $N_{total,int}=1$ CG-PUSCH TO does not include the later of the two consecutive CG-PUSCH transmissions of the first CG-PUSCH configuration. The indication can be encoded and multiplexed in a same manner as HARQ-ACK information. When HARQ-ACK information is also included in the CG-PUSCH transmissions of the first CG-PUSCH configuration, the indication can be appended to the HARQ-ACK information codeword prior to encoding and multiplexing.

Figure 11:
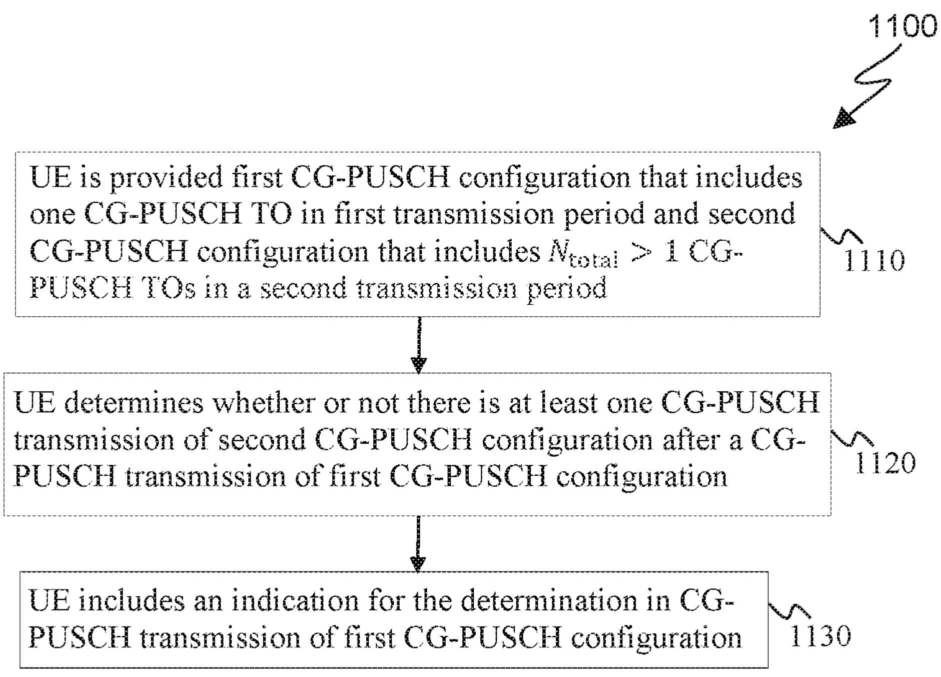
FIG. 11 illustrates an example procedure for a UE to indicate whether or not a subset of CG-PUSCH TOs, from a number of CG-PUSCH TOs of a CG-PUSCH configuration in a transmission period, would be used for CG-PUSCH transmissions according to the disclosure.

FIG. 11 illustrates an example procedure 1100 for a UE to indicate whether or not a subset of CG-PUSCH TOs, from a number of CG-PUSCH TOs of a CG-PUSCH configuration in a transmission period, would be used for CG-PUSCH transmissions according to the disclosure. The procedure 1100 may be performed by a UE (e.g., any of the UEs 111-119 as illustrated in FIG. 1). An embodiment of the UE procedure 1100 shown in FIG. 11 is for illustration only and does not limit the scope of this disclosure to any particular implementation.

A UE is provided a first CG-PUSCH configuration that includes one CG-PUSCH TO in a first transmission period and a second CG-PUSCH configuration that includes $N_{total}>1$ CG-PUSCH TOs in a second transmission period 1110. The UE determines whether or not there is at least one CG-PUSCH transmission of the second CG-PUSCH configuration after a CG-PUSCH transmission of the first CG-PUSCH configuration 1120. The determination can be additionally conditioned to be for a CG-PUSCH transmission of the second CG-PUSCH configuration that is not after an immediately next CG-PUSCH transmission for the first CG-PUSCH configuration. The UE includes an indication, for example using 1 bit, for the determination in the CG-PUSCH transmission of the first CG-PUSCH configuration 1130.

A similar functionality as for providing nrCG-UCI in a CG-PUSCH transmission of a different CG-PUSCH configuration than the one of the nrCG-UCI can be achieved by providing nrCG-UCI in a PUCCH transmission. For example, similar to providing periodic CSI reports, a UE can be provided a configuration for a PUCCH transmission with nrCG-UCI. Additionally, the configuration can be valid only within the transmission period of the CG-PUSCH configuration for the nrCG-UCI. Further, the configuration can be valid only prior to the first CG-PUSCH transmission of the CG-PUSCH configuration for the nrCG-UCI and nrCG-UCI can be subsequently provided in CG-PUSCH transmissions.

In one embodiment, mechanisms and procedures are considered for enabling a UE to report nrCG-UCI when the UE would simultaneously transmit a CG-PUSCH on a first cell and a PUSCH or a PUCCH on a second cell, and after performing procedures to determine a channel for UCI multiplexing as described in TS 38.213 v17.4.0, the UE determines the PUSCH or the PUCCH. The PUSCH is considered to be scheduled by a DCI format.

In a first approach, the UE multiplexes all UCI, including nrCG-UCI, in the PUSCH or the PUCCH and does not multiplex nrCG-UCI in a CG-PUSCH. To avoid an ambiguity at a serving gNB for whether or not nrCG-UCI is included in the UCI, the UE includes nrCG-UCI in the UCI even when the UE does not transmit a CG-PUSCH that would include the nrCG-UCI. For example, when due to an unavailability of an associated video frame a UE does not transmit a CG-PUSCH in a CG-PUSCH TO, from a number of more than one CG-PUSCH TOs of a CG-PUSCH configuration in a transmission period, the UE still multiplexes nrCG-UCI in the PUSCH or the PUCCH that overlaps in time with the CG-PUSCH TO. In such case, a value of the nrCG-UCI can be predetermined, for example a minimum value such 0 or 1, or a maximum value corresponding to all CG-PUSCH TOs of the CG-PUSCH configuration in the transmission period.

In a second approach, the UE multiplexes all UCI in the PUSCH or the PUCCH except for nrCG-UCI (and CG-UCI as described in TS 38.213 v17.4.0). The UE multiplexes nrCG-UCI only in a CG-PUSCH transmission, such as a CG-PUSCH transmission associated with a CG-PUSCH configuration with more than one CG-PUSCH TOs in a transmission period. This approach avoids including nrCG-UCI with other UCI that can be beneficial for the other UCI reliability especially when the nrCG-UCI that does not provide actual information as described above. For UCI multiplexing in a PUCCH, the second approach also avoids any modification to respective procedures for multiplexing or for determination of a PUCCH transmission power, or of a PUCCH resource, and so on.

When a UE would simultaneously transmit a PUCCH with UCI, a CG-PUSCH with nrCG-UCI or with CG-UCI, and one or more PUSCHs without UCI, where all channels have same priority, and a total power would exceed a maximum power, the UE prioritizes power allocation for the PUCCH transmission, followed by power allocation for the CG-PUSCH transmission with nrCG-UCI, and lastly followed by power allocation for the remaining PUSCH transmissions including, if any, a CG-PUSCH transmission that provides CG-UCI. It is also possible to prioritize power allocation to a CG-PUSCH transmission with nrCG-UCI over power allocation to a PUCCH transmission. When a UE would simultaneously transmit a PUSCH with UCI, such as HARQ-ACK information or CSI, and a CG-PUSCH with nrCG-UCI, the UE can prioritize power allocation to the PUSCH transmission with UCI during the time overlapping period of the PUSCH and CG-PUSCH transmissions. Alternatively, the UE can apply a same prioritization for power allocation to the PUSCH and to the CG-PUSCH.

In a third approach, when a UE simultaneously transmits a first PUSCH having a first priority and a second PUSCH or a PUCCH having a second priority, the UE multiplexes UCI having the first priority in the first PUSCH and multiplexes UCI having the second priority in the second PUSCH on in the PUCCH. The nrCG-UCI is included in the UCI with same priority as for the nrCG-UCI. The third approach can also be combined with the first approach or with the second approach.

For multiplexing nrCG-UCI with or without other UCI in a PUSCH or PUCCH, the nrCG-UCI can be considered as HARQ-ACK information. For example, when there is no HARQ-ACK information multiplexed in the PUSCH or PUCCH, nrCG-UCI is encoded and multiplexed in the PUSCH or PUCCH using same procedure as for HARQ-ACK information with same payload. When there is HARQ-ACK information multiplexed in the PUSCH or PUCCH, nrCG-UCI is appended to the HARQ-ACK information and the joint HARQ-ACK information and nrCG-UCI is encoded and multiplexed in the PUSCH or PUCCH using same procedure as for HARQ-ACK information with same payload.

Figure 12:
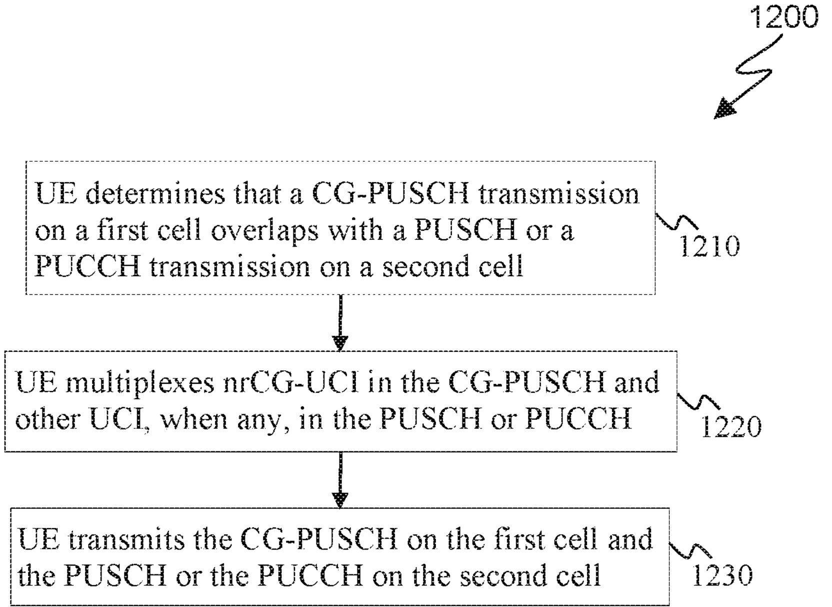
FIG. 12 illustrates an example procedure for a UE to provide new radio CG uplink control information (nrCG-UCI) when a CG-PUSCH TO on a first cell, for a CG-PUSCH configuration with more than one CG-PUSCH TOs in a transmission period, overlaps in time with a PUSCH or a physical uplink control channel (PUCCH) transmission on a second cell according to the disclosure.

FIG. 12 illustrates an example procedure 1200 for a UE to provide nrCG-UCI when a CG-PUSCH TO on a first cell, for a CG-PUSCH configuration with more than one CG-PUSCH TOs in a transmission period, overlaps in time with a PUSCH or a PUCCH transmission on a second cell according to the disclosure. The procedure 1200 may be performed by a UE (e.g., any of the UEs 111-119 as illustrated in FIG. 1). An embodiment of the UE procedure 1200 shown in FIG. 12 is for illustration only and does not limit the scope of this disclosure to any particular implementation.

A UE determines that a CG-PUSCH transmission, for a CG-PUSCH configuration with more than one CG-PUSCH TOs in a transmission period, on a first cell overlaps with a PUSCH or a PUCCH transmission on a second cell 1210. The UE multiplexes nrCG-UCI in the CG-PUSCH transmission 1220 and multiplexes other UCI, when any, in the PUSCH or PUCCH transmission. The UE transmits the CG-PUSCH on the first cell and the PUSCH or the PUCCH on the second cell 1230.

In one embodiment, mechanisms and procedures are considered for enabling a UE to resolve collisions among CG-PUSCH transmissions associated with respective CG-PUSCH configurations. The CG-PUSCH transmissions are assumed to have same priority. Reference to overlapping among CG-PUSCH transmissions is for overlapping in time, such as over symbols of a slot.

When a UE is configured to transmit more than one CG-PUSCHs and the transmissions would overlap over a number of symbols, the UE can perform a procedure to identify CG-PUSCHs to transmit, and therefore also identify CG-PUSCHs to drop from transmission. The prioritization of CG-PUSCH for transmissions can be based on an ascending order of an index associated with corresponding CG-PUSCH configurations. That approach enables a network to control the CG-PUSCHs that the UE would transmit. For example, when a CG-PUSCH transmission with video information overlaps with a CG-PUSCH transmission with pose/control information, the gNB can assign a smaller index to the CG-PUSCH configuration associated with video information and then the UE would transmit the CG-PUSCH with video information and drop the CG-PUSCH transmission with pose/control information. The reverse would apply when the CG-PUSCH configuration associated with pose/control information has a smaller index, for example when the gNB prefers to prioritize pose/control information over video information from a UE.

After a UE drops a first CG-PUSCH transmission, a second CG-PUSCH transmission that overlapped with the first CG-PUSCH transmission may not overlap with any third CG-PUSCH transmission and can therefore be transmitted by the UE instead of being dropped. Therefore, a procedure for a UE to determine CG-PUSCHs that the UE would transmit needs to be recursive with the UE making a determination at each iteration for a CG-PUSCH to transmit and for CG-PUSCHs to drop. The procedure can exclude, prior to its initialization, CG-PUSCHs that overlap with DL symbols of TDD UL-DL configurations that are provided by higher layers, such as by parameters tdd-UL-DL-ConfigurationCommon, or by tdd-UL-DL-ConfigurationDedicated as described in TS 38.213 v17.4.0 and TS 38.331 v17.3.0.

Therefore, after resolving overlapping with symbols in a slot that are indicated as downlink by tdd-UL-DL-ConfigurationCommon or by tdd-UL-DL-ConfigurationDedicated and dropping corresponding CG-PUSCH transmissions, a UE transmits one or more overlapping CG-PUSCHs according to the following procedure. If none of the CG-PUSCHs overlap, the UE transmits all CG-PUSCHs.

Set Q to the set of indexes of CG-PUSCH configurations with overlapping CG-PUSCHs in a slot.

Set T to the set of indexes of CG-PUSCH configurations with CG-PUSCHs to be transmitted in the slot where T is initialized to the empty set ($T=\emptyset$)

while set Q is not the empty set (while $Q\neq\emptyset$)

Add to set T the smallest index $q_{min}$ from set Q ($T=T\cup q_{min}$)

Remove from set Q the index $q_{min}$ and the set of indexes P of CG-PUSCH configurations with CG-PUSCH transmissions overlapping with the CG-PUSCH transmission of CG-PUSCH configuration with index $q_{min}$ ($Q=Q\backslash P$, $Q=Q\backslash q_{min}$)

end while

For example, if the UE would transmit (after resolving overlapping with DL symbols, if any) first, second, third, and fourth overlapping CG-PUSCHs in a slot, associated with respective CG-PUSCH configurations with indexes 0, 1, 2, and 3, the UE first determines to transmit in the slot the first CG-PUSCH. Assuming that transmission of the second and third CG-PUSCHs in the slot would overlap with the transmission of the first CG-PUSCH in the slot, the UE drops transmission for the second and third CG-PUSCHs in the slot. The UE also transmits the fourth CG-PUSCH in the slot when the fourth CG-PUSCH does not overlap with the first CG-PUSCH although the fourth CG-PUSCH can overlap with at least one of the second and third CG-PUSCHs.

Figure 13:
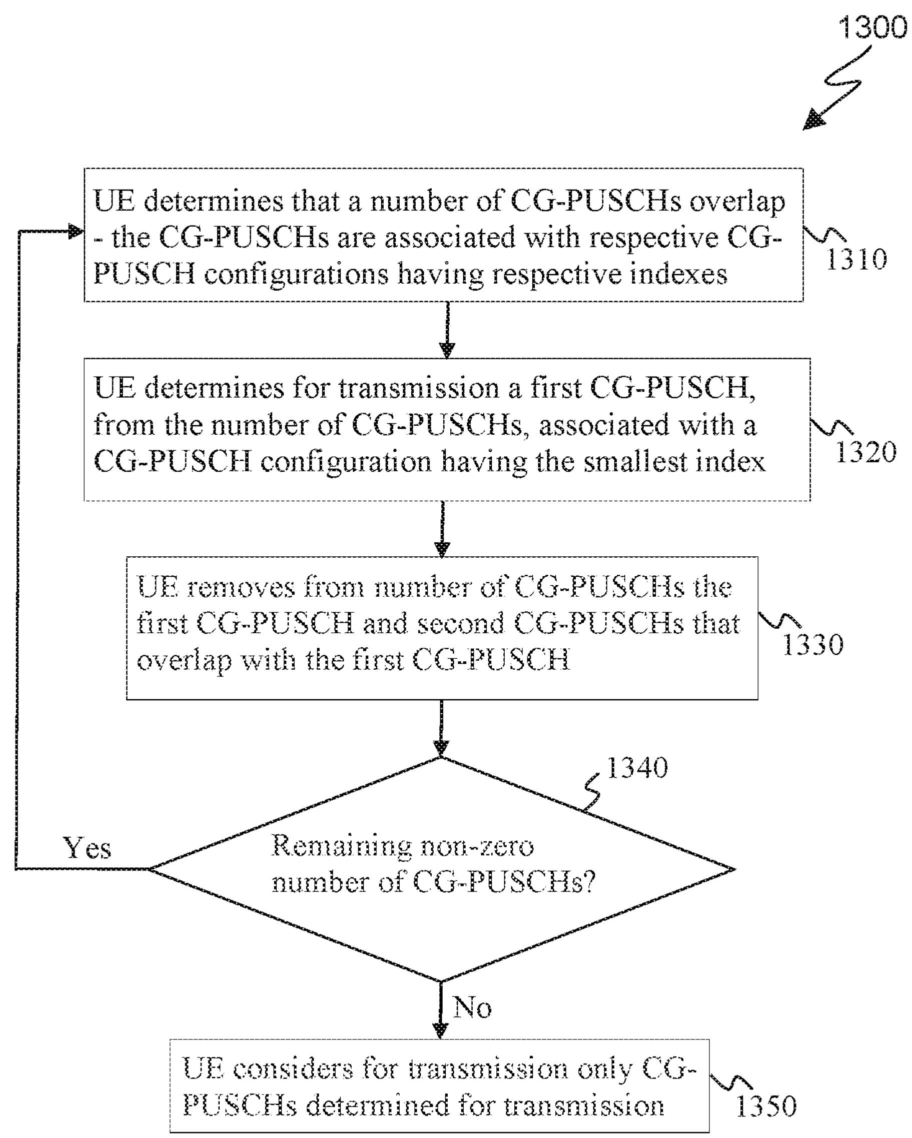
FIG. 13 illustrates an example procedure for a UE to determine a first number of CG-PUSCHs to transmit and a second number of CG-PUSCH to drop from transmission when the first and second numbers of CG-PUSCH overlap in time according to the disclosure.

FIG. 13 illustrates an example procedure 1300 for a UE to determine a first number of CG-PUSCHs to transmit and a second number of CG-PUSCH to drop from transmission when the first and second numbers of CG-PUSCH overlap in time according to the disclosure. The procedure 1300 may be performed by a UE (e.g., any of the UEs 111-119 as illustrated in FIG. 1). An embodiment of the UE procedure 1300 shown in FIG. 13 is for illustration only and does not limit the scope of this disclosure to any particular implementation.

A UE determines that a number of CG-PUSCHs overlap in time, where the CG-PUSCHs are associated with respective CG-PUSCH configurations having respective indexes 1310. The UE determines for transmission a first CG-PUSCH, from the number of CG-PUSCHs, that is associated with a CG-PUSCH configuration having the smallest index 1320. The UE removes from the number of CG-PUSCHs the first CG-PUSCH and also removes second CG-PUSCHs that overlap with the first CG-PUSCH 1330. When there is a remaining non-zero number of CG-PUSCHs 1140, the UE repeats step 610; otherwise, the UE ends the procedure and considers for transmission only the CG-PUSCHs the UE determines for transmission 1150 during the overlapping resolution procedure. The UE transmits the CG-PUSCHs determined for transmission when no other conditions exist for the UE to drop the transmissions, such as for example a collision with another PUSCH with higher priority or, in general, conditions described in TS 38.213 v17.4.0.

Instead of a UE performing a procedure to determine CG-PUSCHs to transmit and CG-PUSCHs to drop transmission, from a number of overlapping CG-PUSCHs, a gNB can avoid such collisions by enhancements in the parameters of a CG-PUSCH configuration. As CG-PUSCH transmissions are periodic, the gNB knows in advance CG-PUSCH configurations that would result to respective CG-PUSCH transmissions that overlap in a slot. The gNB can then provide a bitmap across slots, or with smaller granularity when there can be multiple CG-PUSCH transmissions for a CG-PUSCH configuration in a slot, where a bit value in the bitmap indicates whether or not the UE is to drop the CG-PUSCH transmission in the slot. The bitmap length can be equal to a least common multiple for the periodicities for the CG-PUSCH configurations or can be predetermined. The bitmap length can also be reduced when certain conditions apply, for example when each ratio between each larger periodicity and each smaller periodicity for the CG-PUSCH configurations is an integer, and can then equal to the largest of the ratios. For example, for three CG-PUSCH configurations with respective periodicities of 1 msec, 2 msec, and 5 msec, a bitmap length can be equal to 10. The bitmap can be provided for each configuration or can be optional for some configuration and then a default behavior can apply, such as a corresponding CG-PUSCH is always dropped from transmission or is always transmitted. The default behavior can be indicated by higher layers or can be defined in the specifications of the system operation.

In one embodiment, mechanisms and procedures are considered for enabling a UE to multiplex information from a first CG-PUSCH in a second PUSCH in case of overlapping. The second PUSCH can be a CG-PUSCH or a PUSCH scheduled by a DCI format (DG-PUSCH). Reference to overlapping among CG-PUSCH transmissions is for overlapping in time, such as symbols of a slot. Further, without loss of generality, reference is for a TB in a CG-PUSCH although the PUSCH can also be a DG-PUSCH.

Dropping by a UE a CG-PUSCH transmission in case of collision with another PUSCH transmission can be detrimental to the quality of service or to the system spectral efficiency. For example, when the UE drops a CG-PUSCH transmission with a TB for video information, quality of service decreases as a probability of failing a PDB target to provide a video frame increases. For example, when the UE drops a CG-PUSCH transmission with a TB for pose/control information, a system spectral efficiency, or a quality of service, decreases as a serving gNB does not have a latest information to schedule PDSCH receptions for the UE according to data rates required for the FOV, and consequently the gNB may schedule for data rates that are either unnecessarily large or inappropriately low.

For some applications associated with use of CG-PUSCHs, a size of a first TB provided by a first CG-PUSCH can be much smaller than a size of a second TB provided by a second PUSCH. For example, a size of a TB providing pose/control information is typically orders of magnitude smaller than a size of a TB providing video information. In such cases, instead of a complete loss of the smaller TB due to a collision of transmissions for a corresponding CG-PUSCH with a PUSCH, the smaller TB can be multiplexed in the PUSCH, or information associated with the smaller TB can be multiplexed in the PUSCH.

When a first TB associated with a first CG-PUSCH is multiplexed in a second PUSCH, the first TB can be provided via one or more separate code blocks (CBs) than the CBs corresponding to a second TB associated with the second PUSCH. In that manner, an encoding procedure of the two TBs (or of CBs comprising each of the two TBs) remains separate and there are no additional processing requirements for the UE regarding the encoding of the first and second TBs. The multiplexing of the first TB in the second PUSCH can be before or after the multiplexing of the second TB in the second PUSCH. Therefore, the multiplexing procedure by the UE of the first and second TBs in the second PUSCH can be similar to that when the UE generates a larger TB that comprises of the CBs of the first TB and of the CBs of the second TB.

In a first approach, a set of time-frequency resources (symbols-RBs) for transmitting the second PUSCH, in case the second PUSCH is a CG-PUSCH, can remain as provided by a corresponding second CG-PUSCH configuration, regardless of whether or not the first TB is also multiplexed in the second CG-PUSCH. For a UE that is not power limited, a reception reliability can remain largely unchanged by increasing a power per resource element for the second CG-PUSCH transmission to compensate for an increase in the code rate for the second TB based for example on the $\Delta_{TF,b,f,c}$ component for determining a power of a PUSCH transmission as described in TS 38.213 v17.4.0.

In a second approach, the second CG-PUSCH configuration can include two sets of time-frequency resources (symbols-RBs) for the second CG-PUSCH transmission in a slot; a first set corresponding to the case the first TB is not multiplexed in the second CG-PUSCH and a second set corresponding to the case the first TB is multiplexed in the second CG-PUSCH. In that manner, a reception reliability of the second CG-PUSCH is maintained while avoiding increasing a power for the second CG-PUSCH transmission per resource element.

For both the first and the second approaches, an increase in power or in time-frequency resources of the second CG-PUSCH transmission would be small relative to corresponding values when the first TB is not multiplexed in the second CG-PUSCH transmission because a size of the first TB would typically be several orders or magnitude smaller than a size of the second TB. Therefore, for the first approach, a resulting increase in a code rate of the first and second TBs when they are multiplexed in the second CG-PUSCH, relative to when only the second TB is multiplexed in the second CG-PUSCH (and the first TB is multiplexed in the first CG-PUSCH), would be small. Similar, for the second approach, an additional number of RBs (and/or symbols) for multiplexing both the first and second TBs in the second CG-PUSCH, relative to when only the second TB is multiplexed in the CG-PUSCH, would be small and therefore an increase in the power of the CG-PUSCH transmission, that increases as the number of associated RBs increases, would be small.

In a third approach, the information of the first TB can be quantized and multiplexed as UCI in the second PUSCH. The third approach can be applicable in case the first TB provides control-type information, such as pose/control information. For example, N sets of states of pose/control information for field of view (FOV) can be uniquely mapped to N values of $\lceil \log_2(N) \rceil$ bits, where $\lceil \, \rceil$ is the ceiling function that maps a number to its next larger integer and $\log_2$ is a logarithm with base 2, that are multiplexed in the second PUSCH. The N sets of states, or the mapping between the N sets of states and the N values of $\lceil \log_2(N) \rceil$ bits, can be provided to the UE in advance by higher layers or can be defined in the specifications of the system operation. For example, a first set of FOV states can be mapped to a first value from the N values of $\lceil \log_2(N) \rceil$ bits while a second set of FOV states can be mapped to a second value from the N values of $\lceil \log_2(N) \rceil$ bits. The UCI corresponding to the quantized information, such as a set of FOV states instead of a state from the set of FOV states, for the first TB can be multiplexed in the second PUSCH in a same manner as HARQ-ACK information. In case the UE also multiplexes HARQ-ACK information in the PUSCH, the UCI can be appended to the HARQ-ACK information prior to encoding.

Figure 14:
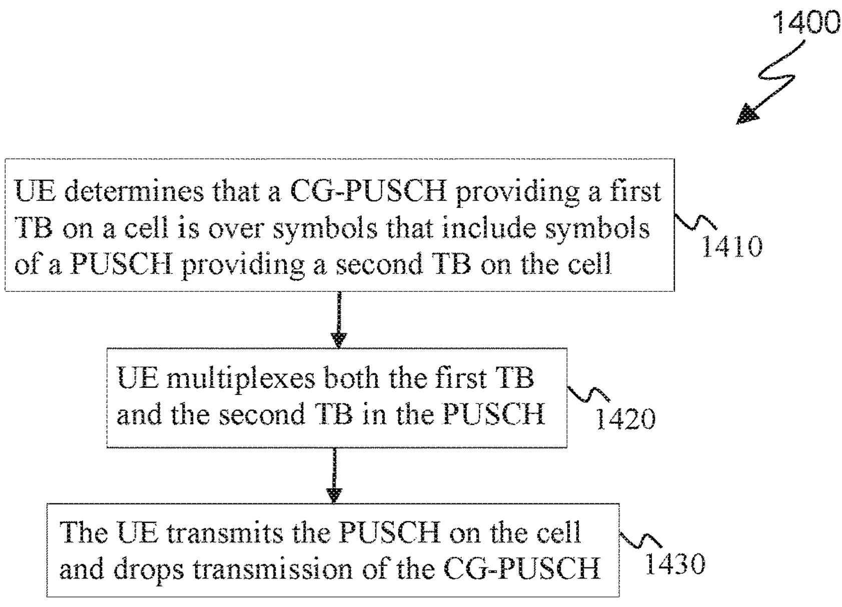
FIG. 14 illustrates an example procedure for a UE to resolve a collision between a CG-PUSCH with a first TB on a cell and a PUSCH with a second TB on the cell by multiplexing the first transport block (TB) in the PUSCH using same time-frequency resources according to the disclosure.

FIG. 14 illustrates an example procedure 1400 for a UE to resolve a collision between a CG-PUSCH with a first TB on a cell and a PUSCH with a second TB on the cell by multiplexing the first TB in the PUSCH using same time-frequency resources according to the disclosure. The procedure 1400 may be performed by a UE (e.g., any of the UEs 111-119 as illustrated in FIG. 1). An embodiment of the UE procedure 1400 shown in FIG. 14 is for illustration only and does not limit the scope of this disclosure to any particular implementation.

A UE determines that a CG-PUSCH transmission providing a first TB on a cell would be over symbols of a slot that include symbols of a PUSCH transmission providing a second TB on the cell 1410. The UE multiplexes both the first TB and the second TB in the PUSCH 1420. The encoding of each TB can be separate and the multiplexing of the first TB in the PUSCH can be before or after the multiplexing of the second TB in the PUSCH. The UE transmits the PUSCH on the cell and drops transmission of the CG-PUSCH 1430. A power for the PUSCH transmission when both the first and second TBs are multiplexed can be larger than a power of the PUSCH transmission when only the second TB is multiplexed.

Figure 15:
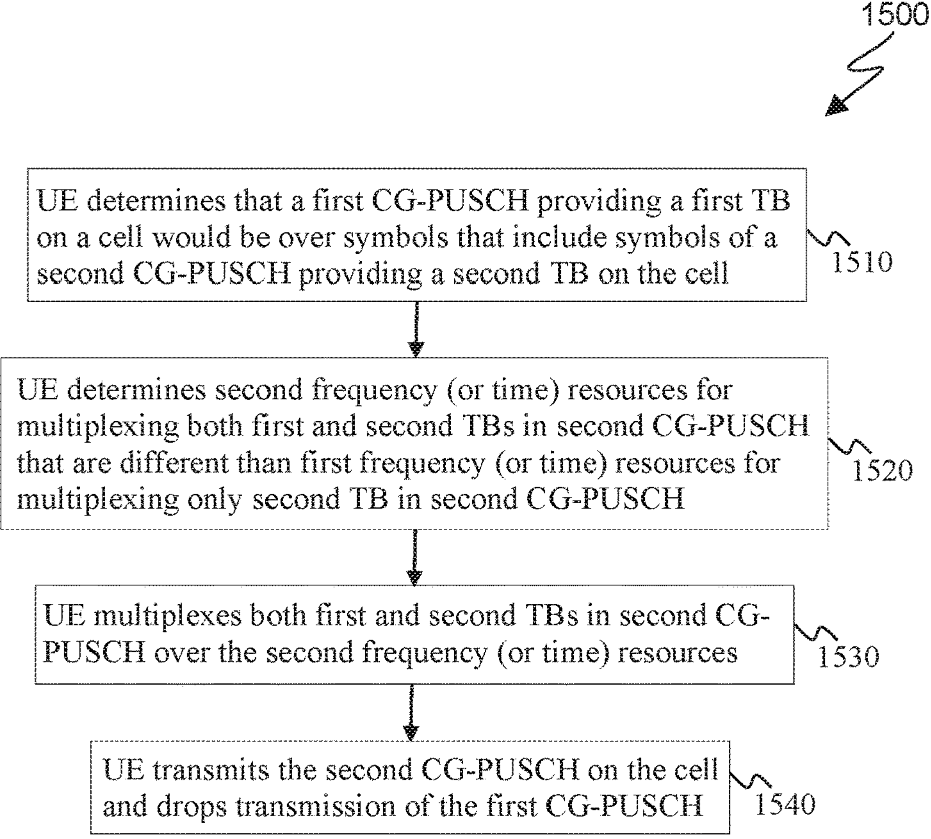
FIG. 15 illustrates an example procedure for a UE to resolve a collision between a first CG-PUSCH with a first TB on a cell and a second CG-PUSCH with a second TB on the cell by multiplexing the first TB in the CG-PUSCH and increasing frequency resources or time resources for the second CG-PUSCH according to the disclosure.

FIG. 15 illustrates an example procedure 1500 for a UE to resolve a collision between a first CG-PUSCH with a first TB on a cell and a second CG-PUSCH with a second TB on the cell by multiplexing the first TB in the CG-PUSCH and increasing frequency resources or time resources for the second CG-PUSCH according to the disclosure. The procedure 1500 may be performed by a UE (e.g., any of the UEs 111-119 as illustrated in FIG. 1). An embodiment of the UE procedure 1500 shown in FIG. 15 is for illustration only and does not limit the scope of this disclosure to any particular implementation.

A UE determines that a first CG-PUSCH transmission providing a first TB on a cell would be over symbols of a slot that include symbols of a second CG-PUSCH transmission providing a second TB on the cell 1510. The UE determines second frequency resources (RBs), or second time resources (symbols), for multiplexing both the first and second TBs in the second CG-PUSCH that are different, such as larger, than first frequency resources (RBs), or first time resources (symbols), for multiplexing only the second TB in the second CG-PUSCH 1520. The UE multiplexes both the first TB and the second TB in the second CG-PUSCH over the second frequency resources or over the second time resources 1530. The encoding of each TB can be separate and the multiplexing of the first TB in the PUSCH can be before or after the multiplexing of the second TB in the second CG-PUSCH. The UE transmits the second CG-PUSCH on the cell and drops transmission of the first CG-PUSCH 1540.

Figure 16:
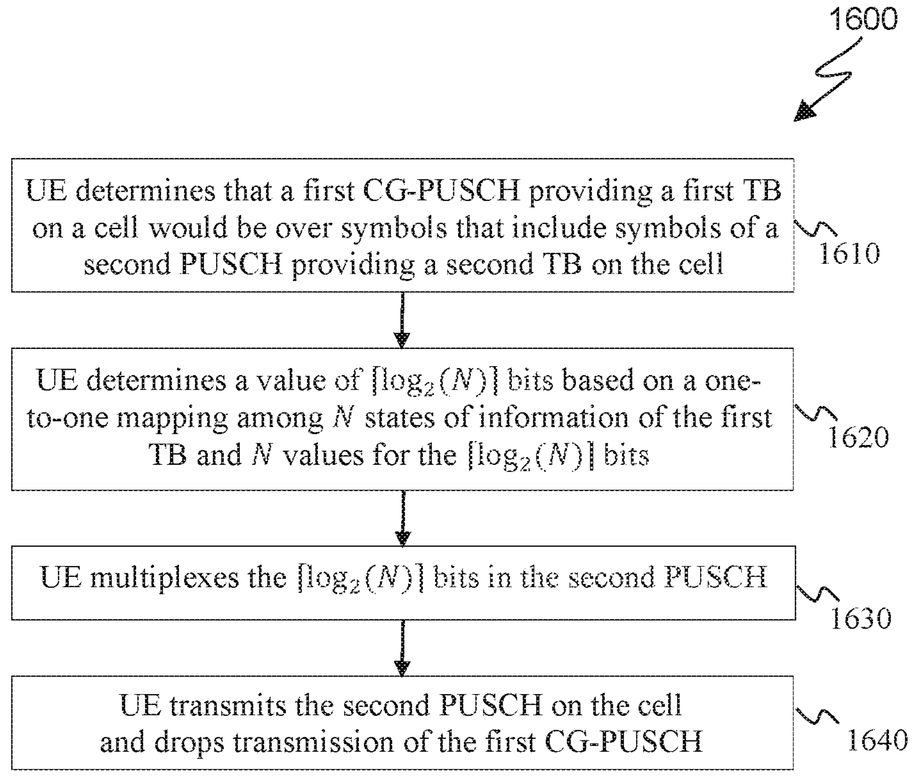
FIG. 16 illustrates an example procedure for a UE to resolve a collision between a first CG-PUSCH with a first TB on a cell and a second PUSCH with a second TB on the cell by quantizing information from the first TB and multiplexing the quantized information as UCI in the second PUSCH according to the disclosure.

FIG. 16 illustrates an example procedure 1600 for a UE to resolve a collision between a first CG-PUSCH with a first TB on a cell and a second PUSCH with a second TB on the cell by quantizing information from the first TB and multiplexing the quantized information as UCI in the second PUSCH according to the disclosure. The procedure 1600 may be performed by a UE (e.g., any of the UEs 111-119 as illustrated in FIG. 1). An embodiment of the UE procedure 1600 shown in FIG. 16 is for illustration only and does not limit the scope of this disclosure to any particular implementation.

A UE determines that a first CG-PUSCH transmission providing a first TB on a cell would be over symbols of a slot that include symbols of a second PUSCH transmission providing a second TB on the cell 1610. The UE determines a value of $\lceil \log_2(N) \rceil$ bits based on a one-to-one mapping among N states of information of the first TB and N values for the $\lceil \log_2(N) \rceil$ bits 1620. The N states of information and/or the mapping are provided to the UE in advance by higher layer signaling or are predetermined in the specifications of the system operation. The UE multiplexes the $\lceil \log_2(N) \rceil$ bits in the second PUSCH 1630. The multiplexing can be as for multiplexing HARQ-ACK information bits. The UE transmits the second PUSCH on the cell and drops transmission of the first CG-PUSCH 1640.

In one embodiment, mechanisms and procedures are considered for enabling a UE to multiplex information from a first CG-PUSCH in a second PUSCH in case of overlapping. The second PUSCH can be a CG-PUSCH or a PUSCH scheduled by a DCI format (DG-PUSCH). Reference to overlapping among CG-PUSCH transmissions is for overlapping in time, such as symbols of a slot. Further, without loss of generality, reference is for a TB in a CG-PUSCH although the PUSCH can also be a DG-PUSCH.

A third embodiment of the disclosure considers procedures for a UE to resolve collisions among PUSCH transmissions and PUCCH transmissions. The PUSCH transmissions and the PUCCH transmissions are assumed to have same priority. The PUSCH transmissions are on a same cell that can be same or different than a cell for the PUCCH transmissions. Reference to overlapping among PUSCH and PUCCH transmissions is for overlapping in time. Simultaneous PUCCH transmissions on the first cell and PUSCH transmissions on the second cell are assumed to not be supported and, based on specified criteria for example as described in TS 38.213 v17.4.0, the UE is assumed to multiplex UCI in a PUSCH transmission on the second cell. The PUSCH transmissions can be CG-PUSCH transmissions or scheduled by a DCI format (DG-PUSCH transmissions).

In a first approach, a UE first resolves collisions, if any, among PUCCHs to typically obtain one resulting PUCCH, for example as described in TS 38.213 v17.4.0. Subsequently, if a number of PUCCHs overlap with a PUSCH, the UE multiplexes corresponding UCI in the PUSCH and does not transmit the PUCCHs. Lastly, the UE resolves collisions among overlapping PUSCHs. With the first approach, a transmission of a PUSCH where the UE multiplexes UCI can be subsequently dropped by the UE due to the procedure for resolving overlapping among PUSCHs, for example as described in the first embodiment of the disclosure.

In a second approach, a UE performs in parallel a first procedure to resolve collisions among PUCCH transmissions and a second procedure to resolve collisions among PUSCH transmission. After the first procedure, for example as described in TS 38.213 v17.4.0, and the second procedure, for example as described in the first embodiment of the disclosure, if a transmission of a PUCCH would overlap with a transmission of a PUSCH, the UE can multiplex UCI in the PUSCH and drop transmission of the PUCCH. As after the second procedure the PUSCH transmissions are non-overlapping, a UE does not drop transmission of a first PUSCH with the UCI due to collision with a transmission of a second PUSCH. In case a PUCCH overlaps with more than one of the PUSCHs, the UE can multiplex the UCI in the earlier of the more than one PUSCHs that satisfies a timeline condition for the UCI multiplexing in a PUSCH, for example a timeline condition described in TS 38.213 v17.4.0.

Figure 17:
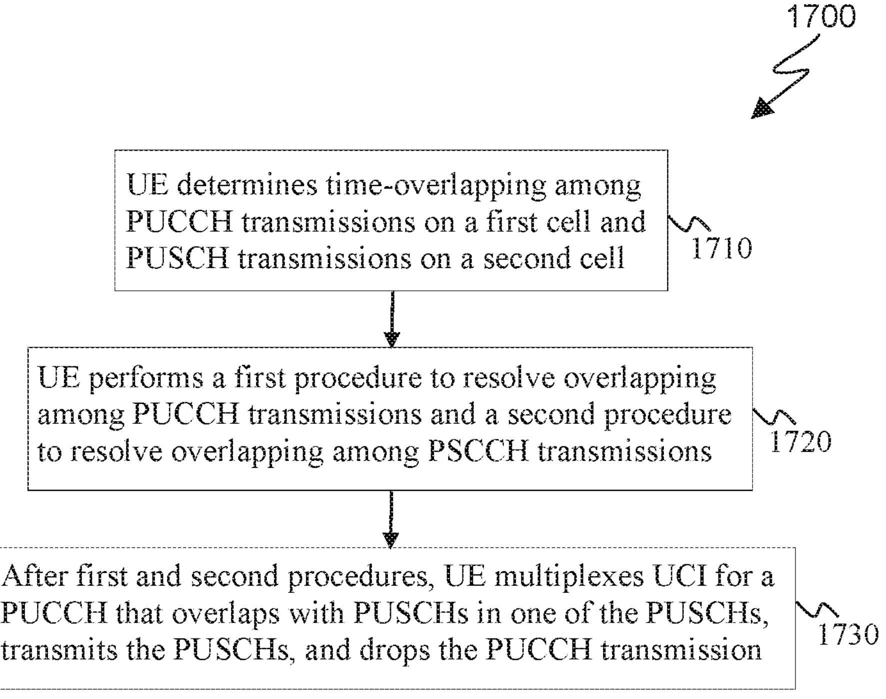
FIG. 17 illustrates an example procedure for a UE to resolve collisions among PUCCH transmissions on a first cell and PUSCH transmissions on a second cell according to the disclosure.

FIG. 17 illustrates an example procedure 1700 for a UE to resolve collisions among PUCCH transmissions on a first cell and PUSCH transmissions on a second cell according to the disclosure. The procedure 1700 may be performed by a UE (e.g., any of the UEs 111-119 as illustrated in FIG. 1). An embodiment of the UE procedure 1700 shown in FIG. 17 is for illustration only and does not limit the scope of this disclosure to any particular implementation.

A UE determines time-overlapping among PUCCH transmissions on a first cell and PUSCH transmissions on a second cell 1710. The first and second cells can be same or different. The UE performs a first procedure to resolve overlapping among the PUCCH transmissions and a second procedure to resolve overlapping among the PSCCH transmissions 1720. After the first and second procedures, the UE multiplexes UCI for a PUCCH on the first cell that overlaps with PUSCHs on the second cell in one of the PUSCHs, transmits the PUSCHs, and drops the PUCCH transmission 1730.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:

receiving, by radio resource control signaling, first information for a configured grant (CG) configuration for transmission of physical uplink shared channels (PUSCHs), wherein the first information includes a time period;

determining:

first transmission occasions (TOs), from a first set of TOs within the time period, for transmission of respective first CG-PUSCHs, and first control information providing an indication of the first TOs;

multiplexing:

the first control information in a first CG-PUSCH from the first CG-PUSCHs, wherein the first CG-PUSCH is earliest in time among the first CG-PUSCHs, and second control information in a PUSCH other than the first CG-PUSCH, wherein the second control information provides first acknowledgement information or channel state information; and transmitting the first CG-PUSCH and the PUSCH, wherein the transmission of the first CG-PUSCH overlaps in time with the transmission of the PUSCH, wherein the steps of determining and multiplexing are performed for transmission of each CG-PUSCH in each respective TO from a set of TOs within the time period.

2. The method of claim 1, further comprising:

determining:

second TOs, from a second set of TOs within the time period, for transmission of second CG-PUSCHs, and third control information providing an indication of the second TOs; and multiplexing the third control information and fourth control information in the first CG-PUSCH from the second CG-PUSCHs, wherein:

the fourth control information is acknowledgement information, and the third control information is appended to the fourth control information prior to jointly encoding the third control information and the fourth control information, wherein transmitting the first CG-PUSCH comprises transmitting the first CG-PUSCH from the second CG-PUSCHs.

3. The method of claim 1, further comprising:

determining:

second TOs, from a second set of TOs within the time period, for transmission of second CG-PUSCHs, and third control information providing an indication of the second TOs; and multiplexing:

the third control information in the first CG-PUSCH from the second CG-PUSCHs, and fourth control information in a physical uplink control channel (PUCCH), wherein the fourth control information is acknowledgement information or channel state information; and transmitting the PUCCH, wherein the transmission of the first CG-PUSCH from the second CG-PUSCHs overlaps in time with the transmission of the PUCCH.

4. The method of claim 1, further comprising:

receiving, by radio resource control signaling, second information for an uplink-downlink (UL-DL) time domain duplex (TDD) configuration; and determining invalid TOs, from the first set of TOs within the time period, based on the UL-DL TDD configuration, wherein:

an invalid TO is a TO where a CG-PUSCH transmission would include downlink symbols of the UL-DL TDD configuration, and the invalid TOs are not included in the first TOs.

5. The method of claim 1, further comprising:

receiving, by radio resource control signaling, second information for a time value; and determining second TOs, from a second set of TOs within the time period, for transmissions of respective second CG-PUSCHs, wherein:

the second TOs are after the first TOs, and if a TO is in the first set of TOs, is in the second set of TOs, and is not in the first TOs, then the TO is not in the second TOs if a start of the TO is not after an end of the first CG-PUSCH transmission by a time that is larger than or equal to the time value.

6. The method of claim 1, further comprising prioritizing power allocation to the transmission of the PUSCH over the transmission of the first CG-PUSCH during the overlap in time.

7. A user equipment (UE), comprising:

a transceiver configured to receive, by radio resource control signaling, first information for a configured grant (CG) configuration for transmission of physical uplink shared channels (PUSCHs), wherein the first information includes a time period; and a processor operably coupled to the transceiver, the processor configured to:

determine first transmission occasions (TOs), from a first set of TOs within the time period, for transmission of respective first CG-PUSCHs;

determine first control information providing an indication of the first TOs;

multiplex the first control information in a first CG-PUSCH from first CG-PUSCHs, wherein the first CG-PUSCH is earliest in time among the first CG-PUSCHs; and multiplex second control information in a PUSCH other than the first CG-PUSCH, wherein the second control information provides first acknowledgement information or channel state information, wherein the transceiver is further configured to transmit the first CG-PUSCH and the PUSCH, wherein the transmission of the first CG-PUSCH overlaps in time with the transmission of the PUSCH, and wherein the processor is further configured to determine a respective TO and multiplex respective control information for transmission of each CG-PUSCH in each respective TO from a set of TOs within the time period.

8. The UE of claim 7, wherein:

the processor is further configured to:

determine second TOs, from a second set of TOs within the time period, for transmission of second CG-PUSCHs, determine third control information providing an indication of the second TOs, and multiplex the third control information and fourth control information in the first CG-PUSCH from the second CG-PUSCHs;

the fourth control information is acknowledgement information;

the third control information is appended to the fourth control information prior to jointly encoding the third control information and the fourth control information; and the transceiver is further configured to transmit the first CG-PUSCH from the second CG-PUSCHs.

9. The UE of claim 7, wherein:

the processor is further configured to:

determine second TOs, from a second set of TOs within the time period, for transmission of second CG-PUSCHs, determine third control information providing an indication of the second TOs, multiplex the third control information in the first CG-PUSCH from the second CG-PUSCHs, and multiplex fourth control information in a physical uplink control channel (PUCCH);

the fourth control information is acknowledgement information or channel state information; and the transceiver is further configured to transmit the PUCCH, wherein the transmission of the first CG-PUSCH from the second CG-PUSCHs overlaps in time with the transmission of the PUCCH.

10. The UE of claim 7, wherein:

the transceiver is further configured to receive, by radio resource control signaling, second information for an uplink-downlink (UL-DL) time domain duplex (TDD) configuration;

the processor is further configured to determine invalid TOs, from the first set of TOs within the time period, based on the UL-DL TDD configuration;

an invalid TO is a TO where a CG-PUSCH transmission would include downlink symbols of the UL-DL TDD configuration; and the invalid TOs are not included in the first TOs.

11. The UE of claim 7, wherein:

the transceiver is further configured to receive, by radio resource control signaling, second information for a time value;

the processor is further configured to determine second TOs, from a second set of TOs within the time period, for transmissions of respective second CG-PUSCHs;

the second TOs are after the first TOs; and if a TO is in the first set of TOs, is in the second set of TOs, and is not in the first TOs, then the TO is not in the second TOs if a start of the TO is not after an end of the first CG-PUSCH transmission by a time that is larger than or equal to the time value.

12. The UE of claim 7, wherein the processor is further configured to prioritize power allocation to the transmission of the PUSCH over the transmission of the first CG-PUSCH during the overlap in time.

13. The UE of claim 7, wherein power allocation is prioritized to the PUSCH over the first CG-PUSCH during the overlap in time.

14. A base station (BS), comprising:

a transceiver configured to transmit, by radio resource control signaling, first information for a configured grant (CG) configuration for reception of physical uplink shared channels (PUSCHs), wherein the first information includes a time period; and a processor operably coupled to the transceiver, the processor configured to determine first reception occasions (ROs), from a first set of ROs within the time period, for reception of respective first CG-PUSCHs;

wherein the transceiver is further configured to receive a first CG-PUSCH from the first CG-PUSCHs and a PUSCH other than the first CG-PUSCH, wherein the first CG-PUSCH is earliest in time among the first CG-PUSCHs, wherein the reception of the first CG-PUSCH overlaps in time with the reception of the PUSCH, the first CG-PUSCH includes multiplexed first control information that provides an indication of the first ROs, and the PUSCH includes multiplexed second control information that provides first acknowledgement information or channel state information, wherein the processor is further configured to determine a respective RO for reception of each CG-PUSCH in each respective RO from a set of ROs within the time period, and wherein respective control information is multiplexed for transmission of each CG-PUSCH in each respective RO from the set of ROs within the time period.

15. The BS of claim 14, wherein:

the processor is further configured to determine second ROs, from a second set of ROs within the time period, for reception of second CG-PUSCHs, the first CG-PUSCH is from the second CG-PUSCHs, the first CG-PUSCH further includes multiplexed third control information and fourth control information, the third control information provides an indication of the second ROs, the fourth control information is acknowledgement information, and the third control information is appended to the fourth control information prior to joint encoding of the third control information and the fourth control information.

16. The BS of claim 14, wherein:

the processor is further configured to determine second ROs, from a second set of ROs within the time period, for reception of second CG-PUSCHs, the first CG-PUSCH is from the second CG-PUSCHs, the first CG-PUSCH further includes multiplexed third control information that provides an indication of the second ROs, the transceiver is further configured to receive a physical uplink control channel (PUCCH) that includes multiplexed fourth control information, and the fourth control information is acknowledgement information or channel state information.

17. The BS of claim 14, wherein:

the transceiver is further configured to transmit, by radio resource control signaling, second information for an uplink-downlink (UL-DL) time domain duplex (TDD) configuration;

the processor is further configured to determine invalid ROs, from the first set of ROs within the time period, based on the UL-DL TDD configuration;

an invalid RO is a RO where a CG-PUSCH reception would include downlink symbols of the UL-DL TDD configuration; and the invalid ROs are not included in the first ROs.

18. The BS of claim 14, wherein:

the transceiver is further configured to transmit, by radio resource control signaling, second information for a time value;

the processor is further configured to determine second ROs, from a second set of ROs within the time period, for receptions of respective second CG-PUSCHs;

the second ROs are after the first ROs; and if a RO is in the first set of ROs, is in the second set of ROs, and is not in the first ROs, then the RO is not in the second ROs if a start of the RO is not after an end of the first CG-PUSCH reception by a time that is larger than or equal to the time value.

* * * * *